(12) United States Patent
Chen et al.

(10) Patent No.: US 7,344,691 B2
(45) Date of Patent: Mar. 18, 2008

(54) SYSTEM AND METHOD FOR MANIPULATING NANOTUBES

(75) Inventors: Jian Chen, Richardson, TX (US); Mark J. Dyer, San Jose, CA (US)

(73) Assignee: Zyvek Performance Materials, LLC, Columbus, OH (US)

(*) Notice: Subject to any disclaimer, the term of this patent is extended or adjusted under 35 U.S.C. 154(b) by 424 days.

(21) Appl. No.: 10/732,490

(22) Filed: Dec. 10, 2003

(65) Prior Publication Data

US 2004/0120879 A1 Jun. 24, 2004

Related U.S. Application Data

(62) Division of application No. 10/044,317, filed on Jan. 11, 2002, now Pat. No. 6,723,299.

(60) Provisional application No. 60/291,101, filed on May 17, 2001.

(51) Int. Cl.
*D01F 9/12* (2006.01)
*C09C 1/44* (2006.01)

(52) U.S. Cl. .................. 423/447.2; 423/460; 977/847; 977/750; 977/752

(58) Field of Classification Search ............ 423/447.2, 423/67, 56, 460; 977/750, 752, 847; 502/24, 502/26
See application file for complete search history.

(56) References Cited

U.S. PATENT DOCUMENTS

| 4,663,230 A | 5/1987 | Tennent |
| 5,098,771 A | 3/1992 | Friend |
| 5,204,038 A | 4/1993 | Heeger et al. |
| 5,281,406 A | 1/1994 | Stalling et al. |
| 5,482,601 A | 1/1996 | Ohshima et al. |
| 5,560,898 A | 10/1996 | Uchida et al. |
| 5,578,543 A | 11/1996 | Tennent et al. |
| 5,611,964 A | 3/1997 | Friend et al. |
| 5,627,140 A | 5/1997 | Fossheim et al. |
| 5,753,088 A | 5/1998 | Olk |
| 5,824,470 A | 10/1998 | Baldeschwieler et al. |

(Continued)

FOREIGN PATENT DOCUMENTS

DE 3118503 11/1982

(Continued)

OTHER PUBLICATIONS

Ajayan, P.M., "Nanotubes from Carbon," Chem. Rev. 1999, 99, 1787-1799.

(Continued)

*Primary Examiner*—Wayne A. Langel
*Assistant Examiner*—James Fiorito
(74) *Attorney, Agent, or Firm*—Haynes and Boone, LLP

(57) ABSTRACT

A system and method for manipulation of nanotubes using an organic material that is presented to the nanotubes. Exemplary types of manipulation include cutting nanotubes into shortened nanotubes, dispersing nanotubes, enabling dissolution of nanotubes, and noncovalently functionalizing nanotubes. The organic material used in manipulating nanotubes preferably comprises a solid organic material, soluble organic material, and/or an organic material that acts as a dispersing reagent for dispersing nanotubes. In a preferred embodiment, the organic material used for manipulating nanotubes comprises cyclodextrin.

59 Claims, 5 Drawing Sheets

U.S. PATENT DOCUMENTS

| | | |
|---|---|---|
| 5,866,434 A | 2/1999 | Massey et al. |
| 5,877,110 A | 3/1999 | Snyder et al. |
| 5,965,470 A | 10/1999 | Bening et al. |
| 5,968,650 A | 10/1999 | Tennent et al. |
| 6,017,390 A | 1/2000 | Charych et al. |
| 6,066,448 A | 5/2000 | Wohlstadter et al. |
| 6,113,819 A | 9/2000 | Tennent et al. |
| 6,140,045 A | 10/2000 | Wohlstadter et al. |
| 6,146,227 A | 11/2000 | Mancevski |
| 6,146,230 A | 11/2000 | Kim et al. |
| 6,180,114 B1 | 1/2001 | Yager et al. |
| 6,187,823 B1 | 2/2001 | Haddon et al. |
| 6,203,814 B1 | 3/2001 | Fisher et al. |
| 6,276,214 B1 | 8/2001 | Kimura et al. |
| 6,284,832 B1 | 9/2001 | Foulger et al. |
| 6,299,812 B1 | 10/2001 | Newman et al. |
| 6,315,956 B1 | 11/2001 | Foulger |
| 6,331,262 B1 | 12/2001 | Haddon et al. |
| 6,362,011 B1 | 3/2002 | Massey et al. |
| 6,368,569 B1 | 4/2002 | Haddon et al. |
| 6,417,265 B1 | 7/2002 | Foulger |
| 6,422,450 B1 | 7/2002 | Zhou et al. |
| 6,426,134 B1 | 7/2002 | Lavin et al. |
| 6,430,511 B1 | 8/2002 | Tour et al. |
| 6,432,320 B1 | 8/2002 | Bonsignore et al. |
| 6,464,908 B1 | 10/2002 | Friend et al. |
| 6,491,789 B2 | 12/2002 | Niu |
| 6,524,466 B1 | 2/2003 | Bonaventura et al. |
| 6,531,513 B2 | 3/2003 | Haddon et al. |
| 6,555,945 B1 | 4/2003 | Baughman et al. |
| 6,569,937 B2 | 5/2003 | Foulger et al. |
| 6,576,341 B1 | 6/2003 | Davey et al. |
| 6,597,090 B1 | 7/2003 | Mancevski |
| 6,599,961 B1 | 7/2003 | Pienkowski et al. |
| 6,610,351 B2 | 8/2003 | Shchegolikhin et al. |
| 6,617,398 B2 | 9/2003 | Yeager et al. |
| 6,630,772 B1 | 10/2003 | Bower et al. |
| 6,634,321 B2 | 10/2003 | Hussain et al. |
| 6,641,793 B2 | 11/2003 | Haddon et al. |
| 6,645,455 B2 | 11/2003 | Margrave et al. |
| 6,656,763 B1 | 12/2003 | Oglesby et al. |
| 6,669,918 B2 | 12/2003 | Schleier-Smith et al. |
| 6,670,179 B1 | 12/2003 | Mattson et al. |
| 6,680,016 B2 | 1/2004 | Wang et al. |
| 6,682,677 B2 | 1/2004 | Lobovsky et al. |
| 6,683,783 B1 | 1/2004 | Smalley et al. |
| 6,685,810 B2 | 2/2004 | Noca et al. |
| 6,693,055 B2 | 2/2004 | Yoon et al. |
| 6,695,974 B2 | 2/2004 | Withers et al. |
| 6,709,566 B2 | 3/2004 | Cumings et al. |
| 6,712,864 B2 | 3/2004 | Horiuchi et al. |
| 6,723,299 B1 | 4/2004 | Chen et al. |
| 6,734,087 B2 | 5/2004 | Hidaka et al. |
| 6,737,939 B2 | 5/2004 | Hoppe et al. |
| 6,741,019 B1 | 5/2004 | Filas et al. |
| 6,746,627 B2 | 6/2004 | Niu et al. |
| 6,746,971 B1 | 6/2004 | Ngo et al. |
| 6,749,712 B2 | 6/2004 | Kuper |
| 6,756,025 B2 | 6/2004 | Colbert et al. |
| 6,756,795 B2 | 6/2004 | Hunt et al. |
| 6,758,891 B2 | 7/2004 | Bergemann et al. |
| 6,762,025 B2 | 7/2004 | Cubicciotti |
| 6,762,237 B2 | 7/2004 | Glatkowski et al. |
| 6,764,540 B2 * | 7/2004 | Taguchi .................. 106/31.27 |
| 6,770,583 B2 | 8/2004 | Keller |
| 6,770,905 B1 | 8/2004 | Buynoski et al. |
| 6,773,954 B1 | 8/2004 | Subramanian et al. |
| 6,774,333 B2 | 8/2004 | Hannah |
| 6,782,154 B2 | 8/2004 | Zhao et al. |
| 6,783,702 B2 | 8/2004 | Niu et al. |
| 6,783,746 B1 | 8/2004 | Zhang et al. |
| 6,790,425 B1 | 9/2004 | Smalley et al. |
| 6,790,790 B1 | 9/2004 | Lyons et al. |
| 6,798,127 B2 | 9/2004 | Mao et al. |
| 6,803,840 B2 | 10/2004 | Hunt et al. |
| 6,805,642 B2 | 10/2004 | Meyer |
| 6,805,801 B1 | 10/2004 | Humayun et al. |
| 6,806,996 B2 | 10/2004 | Tatsuura et al. |
| 6,818,821 B2 | 11/2004 | Fujieda et al. |
| 6,824,974 B2 | 11/2004 | Pisharody et al. |
| 6,825,060 B1 | 11/2004 | Lyons et al. |
| 6,827,918 B2 | 12/2004 | Margrave et al. |
| 6,835,366 B1 | 12/2004 | Margrave et al. |
| 6,841,139 B2 | 1/2005 | Margrave et al. |
| 6,842,328 B2 | 1/2005 | Schott et al. |
| 6,843,850 B2 | 1/2005 | Avouris et al. |
| 6,852,410 B2 | 2/2005 | Veedu et al. |
| 6,861,481 B2 | 3/2005 | Ding et al. |
| 6,866,891 B2 | 3/2005 | Liebau et al. |
| 6,872,681 B2 | 3/2005 | Niu et al. |
| 6,875,274 B2 | 4/2005 | Wong et al. |
| 6,875,412 B2 | 4/2005 | Margrave et al. |
| 6,878,361 B2 | 4/2005 | Clarke et al. |
| 6,878,961 B2 | 4/2005 | Lyons et al. |
| 6,890,654 B2 | 5/2005 | Stupp et al. |
| 6,894,359 B2 | 5/2005 | Bradley et al. |
| 6,896,864 B2 | 5/2005 | Clarke |
| 6,897,009 B2 | 5/2005 | Johnson, Jr. et al. |
| 6,899,945 B2 | 5/2005 | Smalley et al. |
| 6,900,264 B2 | 5/2005 | Kumar et al. |
| 6,902,658 B2 | 6/2005 | Talin et al. |
| 6,902,720 B2 | 6/2005 | McGimpsey |
| 6,905,667 B1 | 6/2005 | Chen et al. |
| 6,908,261 B2 | 6/2005 | Hannay et al. |
| 6,914,372 B1 | 7/2005 | Akiyama et al. |
| 6,921,462 B2 | 7/2005 | Montgomery et al. |
| 6,924,003 B2 | 8/2005 | Zhang |
| 6,934,144 B2 | 8/2005 | Ooma et al. |
| 6,936,322 B2 | 8/2005 | Sakakibara et al. |
| 6,936,653 B2 | 8/2005 | McElrath et al. |
| 6,946,597 B2 | 9/2005 | Sager et al. |
| 6,949,216 B2 | 9/2005 | Brice et al. |
| 6,955,939 B1 | 10/2005 | Lyons et al. |
| 6,958,216 B2 | 10/2005 | Kelley et al. |
| 6,960,425 B2 | 11/2005 | Jung et al. |
| 6,962,092 B2 | 11/2005 | Pasquali et al. |
| 6,969,536 B1 | 11/2005 | Tuck et al. |
| 6,969,690 B2 | 11/2005 | Zhou et al. |
| 6,972,467 B2 | 12/2005 | Zhang et al. |
| 6,974,927 B2 | 12/2005 | Hannah |
| 6,979,248 B2 | 12/2005 | Hu et al. |
| 6,979,709 B2 | 12/2005 | Smalley et al. |
| 6,982,174 B2 | 1/2006 | Bonnell et al. |
| 6,989,325 B2 | 1/2006 | Uang et al. |
| 6,991,528 B2 | 1/2006 | Hu et al. |
| 7,008,563 B2 | 3/2006 | Smalley et al. |
| 7,008,758 B2 | 3/2006 | Park et al. |
| 7,015,393 B2 | 3/2006 | Weiner et al. |
| 7,018,261 B2 | 3/2006 | Perlo et al. |
| 7,025,840 B1 | 4/2006 | Adams |
| 7,026,432 B2 | 4/2006 | Charati et al. |
| 7,029,598 B2 | 4/2006 | Sato |
| 7,029,646 B2 | 4/2006 | Margrave et al. |
| 7,040,948 B2 | 5/2006 | Mao et al. |
| 7,045,087 B2 | 5/2006 | Kotov |
| 7,048,903 B2 | 5/2006 | Colbert et al. |
| 7,048,999 B2 | 5/2006 | Smalley et al. |
| 7,052,668 B2 | 5/2006 | Smalley et al. |
| 7,056,452 B2 | 6/2006 | Niu et al. |
| 7,056,455 B2 | 6/2006 | Matyjaszewski et al. |
| 7,060,241 B2 | 6/2006 | Glatkowski |
| 7,061,749 B2 | 6/2006 | Liu et al. |
| 7,065,857 B2 | 6/2006 | Watanabe et al. |
| 7,066,800 B2 | 6/2006 | Chen et al. |

| | | |
|---|---|---|
| 7,067,096 B2 | 6/2006 | Iijima et al. |
| 7,070,753 B2 | 7/2006 | Niu et al. |
| 7,070,810 B2 | 7/2006 | Hirsch et al. |
| 7,070,923 B1 | 7/2006 | Loftus |
| 7,071,287 B2 | 7/2006 | Rhine et al. |
| 7,074,980 B2 | 7/2006 | Prato et al. |
| 7,075,067 B2 | 7/2006 | Joyce et al. |
| 7,081,429 B2 | 7/2006 | Kishi et al. |
| 7,087,290 B2 | 8/2006 | Feist et al. |
| 7,093,664 B2 | 8/2006 | Todd et al. |
| 7,094,367 B1 | 8/2006 | Harmon et al. |
| 7,094,467 B2 | 8/2006 | Zhang et al. |
| 7,105,596 B2 | 9/2006 | Smalley et al. |
| 7,112,816 B2 | 9/2006 | Schlaf et al. |
| 7,115,305 B2 | 10/2006 | Bronikowski et al. |
| 7,116,273 B2 | 10/2006 | Morikawa et al. |
| 7,118,881 B2 | 10/2006 | Lee et al. |
| 7,122,165 B2 | 10/2006 | Wong et al. |
| 7,122,461 B2 | 10/2006 | Dubin |
| 7,125,533 B2 | 10/2006 | Khabashesku et al. |
| 7,126,207 B2 | 10/2006 | Mosley et al. |
| 7,148,269 B2 | 12/2006 | Winey et al. |
| 7,151,625 B2 | 12/2006 | Nagamura et al. |
| 7,153,903 B1 | 12/2006 | Barraza et al. |
| 7,160,531 B1 | 1/2007 | Jacques et al. |
| 2001/0004471 A1 | 6/2001 | Zhang |
| 2001/0010809 A1 | 8/2001 | Haddon et al. |
| 2001/0016283 A1 | 8/2001 | Shiraishi et al. |
| 2001/0016608 A1 | 8/2001 | Haddon et al. |
| 2001/0031900 A1 | 10/2001 | Margrave et al. |
| 2001/0041160 A1 | 11/2001 | Margrave et al. |
| 2002/0004028 A1 | 1/2002 | Margrave et al. |
| 2002/0004556 A1 | 1/2002 | Foulger et al. |
| 2002/0008956 A1 | 1/2002 | Niu |
| 2002/0028337 A1 | 3/2002 | Yeager et al. |
| 2002/0034757 A1 | 3/2002 | Cubicciotti |
| 2002/0046872 A1 | 4/2002 | Smalley et al. |
| 2002/0048632 A1 | 4/2002 | Smalley et al. |
| 2002/0049495 A1 | 4/2002 | Kutryk et al. |
| 2002/0053257 A1 | 5/2002 | Brice et al. |
| 2002/0053522 A1 | 5/2002 | Cummings et al. |
| 2002/0054995 A1 | 5/2002 | Mazurkiewicz |
| 2002/0068170 A1 | 6/2002 | Smalley et al. |
| 2002/0081397 A1 | 6/2002 | McGill et al. |
| 2002/0081460 A1 | 6/2002 | Feist et al. |
| 2002/0085968 A1 | 7/2002 | Smalley et al. |
| 2002/0086124 A1 | 7/2002 | Margrave et al. |
| 2002/0090330 A1 | 7/2002 | Smalley et al. |
| 2002/0090331 A1 | 7/2002 | Smalley et al. |
| 2002/0092613 A1 | 7/2002 | Kuper |
| 2002/0094311 A1 | 7/2002 | Smalley et al. |
| 2002/0098135 A1 | 7/2002 | Smalley et al. |
| 2002/0100578 A1 | 8/2002 | Withers et al. |
| 2002/0102194 A1 | 8/2002 | Smalley et al. |
| 2002/0102196 A1 | 8/2002 | Smalley et al. |
| 2002/0102617 A1 | 8/2002 | MacBeath et al. |
| 2002/0110513 A1 | 8/2002 | Margrave et al. |
| 2002/0113335 A1 | 8/2002 | Lobovsky et al. |
| 2002/0117659 A1 | 8/2002 | Lieber et al. |
| 2002/0122765 A1 | 9/2002 | Horiuchi et al. |
| 2002/0127162 A1 | 9/2002 | Smalley et al. |
| 2002/0127169 A1 | 9/2002 | Smalley et al. |
| 2002/0136681 A1 | 9/2002 | Smalley et al. |
| 2002/0136683 A1 | 9/2002 | Smalley et al. |
| 2002/0141934 A1 | 10/2002 | Gogotsi et al. |
| 2002/0150524 A1 | 10/2002 | Smalley et al. |
| 2002/0159943 A1 | 10/2002 | Smalley et al. |
| 2002/0167374 A1 | 11/2002 | Hunt et al. |
| 2002/0167375 A1 | 11/2002 | Hoppe et al. |
| 2002/0172639 A1 | 11/2002 | Horiuchi et al. |
| 2002/0172963 A1 | 11/2002 | Kelley et al. |
| 2002/0176650 A1 | 11/2002 | Zhao et al. |
| 2002/0180077 A1 | 12/2002 | Glatkowski et al. |
| 2002/0180306 A1 | 12/2002 | Hunt et al. |
| 2002/0197474 A1 | 12/2002 | Reynolds |
| 2003/0001141 A1 | 1/2003 | Sun et al. |
| 2003/0008123 A1 | 1/2003 | Glatkowski et al. |
| 2003/0012723 A1 | 1/2003 | Clarke |
| 2003/0017936 A1 | 1/2003 | Yoon et al. |
| 2003/0026754 A1* | 2/2003 | Clarke et al. ............ 423/447.2 |
| 2003/0039604 A1 | 2/2003 | Nie et al. |
| 2003/0039860 A1 | 2/2003 | Cheon et al. |
| 2003/0044608 A1 | 3/2003 | Yoshizawa et al. |
| 2003/0052006 A1 | 3/2003 | Noca et al. |
| 2003/0065206 A1 | 4/2003 | Bolskar et al. |
| 2003/0065355 A1 | 4/2003 | Weber et al. |
| 2003/0066956 A1 | 4/2003 | Gruber et al. |
| 2003/0077515 A1 | 4/2003 | Chen et al. |
| 2003/0083421 A1 | 5/2003 | Kumar et al. |
| 2003/0086858 A1 | 5/2003 | Niu et al. |
| 2003/0089890 A1 | 5/2003 | Niu et al. |
| 2003/0089893 A1 | 5/2003 | Niu et al. |
| 2003/0091750 A1 | 5/2003 | Chen |
| 2003/0093107 A1 | 5/2003 | Parsonage et al. |
| 2003/0101901 A1 | 6/2003 | Bergemann et al. |
| 2003/0102585 A1 | 6/2003 | Poulin et al. |
| 2003/0108477 A1 | 6/2003 | Keller et al. |
| 2003/0111333 A1 | 6/2003 | Motgomery et al. |
| 2003/0111646 A1 | 6/2003 | Niu et al. |
| 2003/0111946 A1 | 6/2003 | Talin et al. |
| 2003/0113714 A1 | 6/2003 | Belcher et al. |
| 2003/0116757 A1 | 6/2003 | Miyoshi et al. |
| 2003/0118815 A1 | 6/2003 | Rodriguez et al. |
| 2003/0122111 A1 | 7/2003 | Glatkowski |
| 2003/0129471 A1 | 7/2003 | Kitade et al. |
| 2003/0133865 A1 | 7/2003 | Smalley et al. |
| 2003/0134736 A1 | 7/2003 | Keller |
| 2003/0142456 A1 | 7/2003 | Carnahan |
| 2003/0144185 A1 | 7/2003 | McGimpsey |
| 2003/0148086 A1 | 8/2003 | Pfefferle et al. |
| 2003/0151030 A1 | 8/2003 | Gurin |
| 2003/0153965 A1 | 8/2003 | Supronowicz et al. |
| 2003/0155143 A1 | 8/2003 | Fujieda et al. |
| 2003/0158351 A1 | 8/2003 | Smith et al. |
| 2003/0164477 A1 | 9/2003 | Zhou et al. |
| 2003/0168756 A1 | 9/2003 | Balkus, Jr. et al. |
| 2003/0170166 A1 | 9/2003 | Smalley et al. |
| 2003/0170167 A1 | 9/2003 | Nikolaev et al. |
| 2003/0175803 A1 | 9/2003 | Tsionsky et al. |
| 2003/0178607 A1 | 9/2003 | Swager et al. |
| 2003/0180491 A1 | 9/2003 | Hirsch et al. |
| 2003/0180526 A1 | 9/2003 | Winey et al. |
| 2003/0181328 A1 | 9/2003 | Hwang et al. |
| 2003/0183560 A1 | 10/2003 | Hannah |
| 2003/0185741 A1 | 10/2003 | Matyjaszewski et al. |
| 2003/0185985 A1 | 10/2003 | Bronikowski et al. |
| 2003/0186167 A1 | 10/2003 | Johnson, Jr. et al. |
| 2003/0203139 A1 | 10/2003 | Ren et al. |
| 2003/0205457 A1 | 11/2003 | Choi et al. |
| 2003/0207984 A1 | 11/2003 | Ding et al. |
| 2003/0209448 A1 | 11/2003 | Hu et al. |
| 2003/0211028 A1 | 11/2003 | Smalley et al. |
| 2003/0211029 A1 | 11/2003 | Someya et al. |
| 2003/0215816 A1 | 11/2003 | Sundararajan et al. |
| 2003/0216502 A1 | 11/2003 | McElrath et al. |
| 2003/0218224 A1 | 11/2003 | Schlaf et al. |
| 2003/0220518 A1 | 11/2003 | Bolskar et al. |
| 2003/0227243 A1 | 12/2003 | Perlo et al. |
| 2003/0228467 A1 | 12/2003 | Liebau et al. |
| 2004/0000661 A1 | 1/2004 | Sato |
| 2004/0007528 A1 | 1/2004 | Bakajin et al. |
| 2004/0009114 A1 | 1/2004 | Margrave et al. |
| 2004/0013597 A1 | 1/2004 | Mao et al. |
| 2004/0016912 A1 | 1/2004 | Bandyopadhyay et al. |
| 2004/0018139 A1 | 1/2004 | Mancevski |
| 2004/0018371 A1 | 1/2004 | Mao |

| | | | | | | |
|---|---|---|---|---|---|---|
| 2004/0018423 A1 | 1/2004 | Bollito et al. | | 2004/0209782 A1 | 10/2004 | Zhang et al. |
| 2004/0018543 A1 | 1/2004 | Balavoine et al. | | 2004/0211942 A1 | 10/2004 | Clark et al. |
| 2004/0022677 A1 | 2/2004 | Wohlstadter et al. | | 2004/0217336 A1 | 11/2004 | Niu et al. |
| 2004/0022718 A1 | 2/2004 | Stupp et al. | | 2004/0217520 A1 | 11/2004 | Hong et al. |
| 2004/0023610 A1 | 2/2004 | Hu et al. | | 2004/0219093 A1 | 11/2004 | Kim et al. |
| 2004/0028599 A1 | 2/2004 | Pierard et al. | | 2004/0219221 A1 | 11/2004 | Moore et al. |
| 2004/0028859 A1 | 2/2004 | LeGrande et al. | | 2004/0222080 A1 | 11/2004 | Tour et al. |
| 2004/0029297 A1 | 2/2004 | Bonnell et al. | | 2004/0222413 A1 | 11/2004 | Hsu et al. |
| 2004/0029706 A1 | 2/2004 | Barrera et al. | | 2004/0223900 A1 | 11/2004 | Khabashesku |
| 2004/0034177 A1 | 2/2004 | Chen | | 2004/0231975 A1 | 11/2004 | Boyd et al. |
| 2004/0035355 A1 | 2/2004 | Avouris et al. | | 2004/0232073 A1 | 11/2004 | Papadimitrakopoulos |
| 2004/0036056 A1 | 2/2004 | Shea et al. | | 2004/0232389 A1 | 11/2004 | Elkovitch et al. |
| 2004/0036128 A1 | 2/2004 | Zhang et al. | | 2004/0240144 A1 | 12/2004 | Schott et al. |
| 2004/0038007 A1 | 2/2004 | Kotov et al. | | 2004/0241080 A1 | 12/2004 | Nagy et al. |
| 2004/0038251 A1 | 2/2004 | Smalley et al. | | 2004/0241896 A1 | 12/2004 | Zhou et al. |
| 2004/0040834 A1 | 3/2004 | Smalley et al. | | 2004/0241900 A1 | 12/2004 | Tsukamoto et al. |
| 2004/0041154 A1 | 3/2004 | Watanabe et al. | | 2004/0245085 A1 | 12/2004 | Srinivasan et al. |
| 2004/0048241 A1 | 3/2004 | Freeman et al. | | 2004/0247808 A1 | 12/2004 | Cooper et al. |
| 2004/0051933 A1 | 3/2004 | Tatsuura et al. | | 2004/0248282 A1 | 12/2004 | Sobha et al. |
| 2004/0058058 A1 | 3/2004 | Shchegolikhin et al. | | 2004/0251042 A1 | 12/2004 | Weiner et al. |
| 2004/0058457 A1 | 3/2004 | Huang et al. | | 2004/0254297 A1 | 12/2004 | Hsu et al. |
| 2004/0069454 A1 | 4/2004 | Bonsignore et al. | | 2004/0257307 A1 | 12/2004 | Bae et al. |
| 2004/0070326 A1 | 4/2004 | Mao et al. | | 2004/0258603 A1 | 12/2004 | Yakobson et al. |
| 2004/0071624 A1 | 4/2004 | Tour et al. | | 2004/0262636 A1 | 12/2004 | Yang et al. |
| 2004/0071949 A1 | 4/2004 | Glatkowski et al. | | 2004/0265209 A1 | 12/2004 | Colbert et al. |
| 2004/0076681 A1 | 4/2004 | Dennis et al. | | 2004/0265755 A1 | 12/2004 | Park et al. |
| 2004/0082247 A1 | 4/2004 | Desai et al. | | 2004/0266939 A1 | 12/2004 | Chen et al. |
| 2004/0084353 A1 | 5/2004 | Hannah | | 2005/0001100 A1 | 1/2005 | His-Wu et al. |
| 2004/0092329 A1 | 5/2004 | Meyer | | 2005/0001528 A1 | 1/2005 | Mao et al. |
| 2004/0092330 A1 | 5/2004 | Meyer et al. | | 2005/0002849 A1 | 1/2005 | Mitsui et al. |
| 2004/0101634 A1 | 5/2004 | Park et al. | | 2005/0002851 A1 | 1/2005 | McElrath et al. |
| 2004/0102577 A1 | 5/2004 | Hsu et al. | | 2005/0006623 A1 | 1/2005 | Wong et al. |
| 2004/0105726 A1 | 6/2004 | Hannay et al. | | 2005/0006643 A1 | 1/2005 | Lan et al. |
| 2004/0113127 A1 | 6/2004 | Min et al. | | 2005/0007680 A1 | 1/2005 | Naganuma et al. |
| 2004/0115232 A1 | 6/2004 | Giroud et al. | | 2005/0008919 A1 | 1/2005 | Extrand et al. |
| 2004/0115501 A1 | 6/2004 | Hinokuma et al. | | 2005/0019791 A1 | 1/2005 | Jung et al. |
| 2004/0120100 A1 | 6/2004 | Reynolds, III | | 2005/0022726 A1 | 2/2005 | Wong et al. |
| 2004/0120879 A1 | 6/2004 | Chen et al. | | 2005/0025694 A1 | 2/2005 | Zhang et al. |
| 2004/0121018 A1 | 6/2004 | Grate et al. | | 2005/0026163 A1 | 2/2005 | Sundararajan et al. |
| 2004/0124504 A1 | 7/2004 | Hsu | | 2005/0029498 A1 | 2/2005 | Elkovitch et al. |
| 2004/0127637 A1 | 7/2004 | Hsu et al. | | 2005/0031525 A1 | 2/2005 | Iijima et al. |
| 2004/0131835 A1 | 7/2004 | Schmitt et al. | | 2005/0031526 A1 | 2/2005 | Clarke |
| 2004/0131859 A1 | 7/2004 | Yerushalmi-Rozen et al. | | 2005/0035334 A1 | 2/2005 | Korzhenko et al. |
| 2004/0131934 A1 | 7/2004 | Sugnaux et al. | | 2005/0038171 A1 | 2/2005 | Elkovitch et al. |
| 2004/0132072 A1 | 7/2004 | Zheng et al. | | 2005/0038203 A1 | 2/2005 | Elkovitch et al. |
| 2004/0132845 A1 | 7/2004 | Rhine et al. | | 2005/0038225 A1 | 2/2005 | Charati et al. |
| 2004/0136893 A1 | 7/2004 | Horiuchi et al. | | 2005/0040370 A1 | 2/2005 | Gurin |
| 2004/0136894 A1 | 7/2004 | Yoshizawa et al. | | 2005/0040371 A1 | 2/2005 | Watanabe et al. |
| 2004/0137834 A1 | 7/2004 | Webb et al. | | 2005/0042450 A1 | 2/2005 | Sano et al. |
| 2004/0142172 A1 | 7/2004 | Sugiyama et al. | | 2005/0043503 A1 | 2/2005 | Stoddart et al. |
| 2004/0142285 A1 | 7/2004 | Jung et al. | | 2005/0045030 A1 | 3/2005 | Tonkovich et al. |
| 2004/0146452 A1 | 7/2004 | Fujieda et al. | | 2005/0045477 A1 | 3/2005 | Wei et al. |
| 2004/0146863 A1 | 7/2004 | Pisharody et al. | | 2005/0045877 A1 | 3/2005 | Lyons et al. |
| 2004/0149759 A1 | 8/2004 | Moser et al. | | 2005/0048697 A1 | 3/2005 | Uang et al. |
| 2004/0160156 A1 | 8/2004 | Ohata et al. | | 2005/0053826 A1 | 3/2005 | Wang et al. |
| 2004/0166152 A1 | 8/2004 | Hirsch et al. | | 2005/0061451 A1 | 3/2005 | Busnaina et al. |
| 2004/0167014 A1 | 8/2004 | Yan et al. | | 2005/0062034 A1 | 3/2005 | Dubin |
| 2004/0169151 A1 | 9/2004 | Yagi et al. | | 2005/0064647 A1 | 3/2005 | Manabe et al. |
| 2004/0171779 A1 | 9/2004 | Matyjaszewski et al. | | 2005/0065229 A1 | 3/2005 | Bonnet et al. |
| 2004/0177451 A1 | 9/2004 | Poulin et al. | | 2005/0069669 A1 | 3/2005 | Sakaibara et al. |
| 2004/0179989 A1 | 9/2004 | Height et al. | | 2005/0069701 A1 | 3/2005 | Watanabe et al. |
| 2004/0180201 A1 | 9/2004 | Veedu et al. | | 2005/0070654 A1 | 3/2005 | Hsu |
| 2004/0180244 A1 | 9/2004 | Tour et al. | | 2005/0074390 A1 | 4/2005 | Tour et al. |
| 2004/0184982 A1 | 9/2004 | Burrington et al. | | 2005/0074565 A1 | 4/2005 | Cok |
| 2004/0185342 A1 | 9/2004 | Takeuchi et al. | | 2005/0074613 A1 | 4/2005 | Tour et al. |
| 2004/0186220 A1 | 9/2004 | Smalley et al. | | 2005/0079386 A1 | 4/2005 | Brown, Jr. et al. |
| 2004/0191698 A1 | 9/2004 | Yagi et al. | | 2005/0081625 A1 | 4/2005 | Chen et al. |
| 2004/0194944 A1 | 10/2004 | Hendricks et al. | | 2005/0083635 A1 | 4/2005 | Ooma et al. |
| 2004/0197638 A1 | 10/2004 | McElrath et al. | | 2005/0087726 A1 | 4/2005 | Anazawa et al. |
| 2004/0202603 A1 | 10/2004 | Fischer et al. | | 2005/0089677 A1 | 4/2005 | Marissen et al. |
| 2004/0204915 A1 | 10/2004 | Steinthal et al. | | 2005/0089684 A1 | 4/2005 | Barron et al. |
| 2004/0206941 A1 | 10/2004 | Gurin | | 2005/0090015 A1 | 4/2005 | Hartmann-Thompson |
| 2004/0206942 A1 | 10/2004 | Hsu | | 2005/0090388 A1 | 4/2005 | Kishi et al. |

| | | | | | |
|---|---|---|---|---|---|
| 2005/0093425 A1 | 5/2005 | Sugiyama | 2005/0221038 A1 | 10/2005 | Park |
| 2005/0095191 A1 | 5/2005 | Goel et al. | 2005/0221473 A1 | 10/2005 | Dubin et al. |
| 2005/0098204 A1 | 5/2005 | Roscheisen et al. | 2005/0222333 A1 | 10/2005 | Hsu |
| 2005/0098205 A1 | 5/2005 | Roscheisen et al. | 2005/0224765 A1 | 10/2005 | Hsu et al. |
| 2005/0098437 A1 | 5/2005 | Shiepe | 2005/0224788 A1 | 10/2005 | Hsu et al. |
| 2005/0100499 A1 | 5/2005 | Oya et al. | 2005/0226778 A1 | 10/2005 | Houser et al. |
| 2005/0100501 A1 | 5/2005 | Veedu et al. | 2005/0228110 A1 | 10/2005 | Ko et al. |
| 2005/0100960 A1 | 5/2005 | Dai et al. | 2005/0228140 A1 | 10/2005 | Rajagopalan et al. |
| 2005/0103097 A1 | 5/2005 | Faltum et al. | 2005/0229334 A1 | 10/2005 | Huang et al. |
| 2005/0107182 A1 | 5/2005 | Meyer et al. | 2005/0229335 A1 | 10/2005 | Huang et al. |
| 2005/0112052 A1 | 5/2005 | Gu et al. | 2005/0230270 A1 | 10/2005 | Ren et al. |
| 2005/0112451 A1 | 5/2005 | Lee et al. | 2005/0233158 A1 | 10/2005 | Tour et al. |
| 2005/0113669 A1 | 5/2005 | Helfer et al. | 2005/0234263 A1 | 10/2005 | Prato et al. |
| 2005/0113676 A1 | 5/2005 | Weiner et al. | 2005/0238810 A1 | 10/2005 | Scaringe et al. |
| 2005/0113874 A1 | 5/2005 | Connelly et al. | 2005/0239948 A1 | 10/2005 | Haik et al. |
| 2005/0113876 A1 | 5/2005 | Weiner et al. | 2005/0242089 A1 | 11/2005 | Benitsch et al. |
| 2005/0116214 A1 | 6/2005 | Mammana et al. | 2005/0242344 A1 | 11/2005 | Lee et al. |
| 2005/0116336 A1 | 6/2005 | Chopra et al. | 2005/0244326 A1 | 11/2005 | Colbert et al. |
| 2005/0118372 A1 | 6/2005 | Bonnet et al. | 2005/0244991 A1 | 11/2005 | Mao et al. |
| 2005/0118403 A1 | 6/2005 | Anazawa et al. | 2005/0245667 A1 | 11/2005 | Harmon et al. |
| 2005/0121068 A1 | 6/2005 | Sager et al. | 2005/0245690 A1 | 11/2005 | Rajagopalan et al. |
| 2005/0124020 A1 | 6/2005 | Lee et al. | 2005/0247237 A1 | 11/2005 | Schukat et al. |
| 2005/0124535 A1 | 6/2005 | McGimpsey | 2005/0250244 A1 | 11/2005 | Li et al. |
| 2005/0127030 A1 | 6/2005 | Watanabe et al. | 2005/0254760 A1 | 11/2005 | Sakakibara et al. |
| 2005/0129573 A1 | 6/2005 | Gabriel et al. | 2005/0255030 A1 | 11/2005 | Tour et al. |
| 2005/0129858 A1 | 6/2005 | Jin et al. | 2005/0255312 A1 | 11/2005 | Fujihara et al. |
| 2005/0130258 A1 | 6/2005 | Trent et al. | 2005/0257946 A1 | 11/2005 | Kirby et al. |
| 2005/0130296 A1 | 6/2005 | Pispharody et al. | 2005/0261670 A1 | 11/2005 | Weber et al. |
| 2005/0131163 A1 | 6/2005 | Rhine et al. | 2005/0262674 A1 | 12/2005 | Reynolds, III |
| 2005/0133363 A1 | 6/2005 | Hu et al. | 2005/0263456 A1 | 12/2005 | Cooper et al. |
| 2005/0133372 A1 | 6/2005 | Zhou et al. | 2005/0266605 A1 | 12/2005 | Kawakami |
| 2005/0143508 A1 | 6/2005 | Tyagi et al. | 2005/0271648 A1 | 12/2005 | Sugiyama |
| 2005/0147373 A1 | 7/2005 | Zhang | 2005/0271829 A1 | 12/2005 | Kumar et al. |
| 2005/0147553 A1 | 7/2005 | Wong et al. | 2005/0272143 A1 | 12/2005 | Bureau et al. |
| 2005/0148984 A1 | 7/2005 | Lindsay et al. | 2005/0272856 A1 | 12/2005 | Cooper et al. |
| 2005/0154116 A1 | 7/2005 | Nagy et al. | 2005/0276743 A1 | 12/2005 | Lacombe et al. |
| 2005/0155216 A1 | 7/2005 | Cho et al. | 2005/0277160 A1 | 12/2005 | Shiba et al. |
| 2005/0158390 A1 | 7/2005 | Rana et al. | 2005/0277201 A1 | 12/2005 | Sivarajan et al. |
| 2005/0158612 A1 | 7/2005 | LeCostaouec et al. | 2005/0277675 A1 | 12/2005 | Fuugetsu et al. |
| 2005/0159524 A1 | 7/2005 | Rajagopalan et al. | 2005/0279478 A1 | 12/2005 | Draper et al. |
| 2005/0160798 A1 | 7/2005 | Pasquali et al. | 2005/0284337 A1 | 12/2005 | Shigematsu et al. |
| 2005/0161212 A1 | 7/2005 | Leismer et al. | 2005/0287371 A1 | 12/2005 | Chaudhari et al. |
| 2005/0162606 A1 | 7/2005 | Doane et al. | 2005/0287414 A1 | 12/2005 | Noh |
| 2005/0165155 A1 | 7/2005 | Blanchet-Fincher | 2006/0001013 A1 | 1/2006 | Dupire et al. |
| 2005/0169798 A1 | 8/2005 | Bradley et al. | 2006/0002841 A1 | 1/2006 | Chen et al. |
| 2005/0169830 A1 | 8/2005 | Smalley et al. | 2006/0003203 A1 | 1/2006 | Wang et al. |
| 2005/0169831 A1 | 8/2005 | Montgomery et al. | 2006/0003401 A1 | 1/2006 | Lee et al. |
| 2005/0170121 A1 | 8/2005 | Bonnet et al. | 2006/0014068 A1 | 1/2006 | Boysen et al. |
| 2005/0170169 A1 | 8/2005 | Watanabe et al. | 2006/0014155 A1 | 1/2006 | Hamers et al. |
| 2005/0179594 A1 | 8/2005 | Morikawa et al. | 2006/0014375 A1 | 1/2006 | Ford et al. |
| 2005/0181209 A1 | 8/2005 | Karandikar | 2006/0016552 A1 | 1/2006 | Barbone et al. |
| 2005/0184294 A1 | 8/2005 | Zhang | 2006/0019093 A1 | 1/2006 | Zhang et al. |
| 2005/0186333 A1 | 8/2005 | Douglas | 2006/0024503 A1 | 2/2006 | Wong et al. |
| 2005/0186378 A1 | 8/2005 | Bhatt | 2006/0025515 A1 | 2/2006 | Scaringe et al. |
| 2005/0186565 A1 | 8/2005 | Malak | 2006/0027499 A1 | 2/2006 | Ajayan et al. |
| 2005/0191490 A1 | 9/2005 | Ton-That et al. | 2006/0029537 A1 | 2/2006 | Zhang et al. |
| 2005/0194036 A1 | 9/2005 | Basol | 2006/0032702 A1 | 2/2006 | Linsmeier et al. |
| 2005/0194038 A1 | 9/2005 | Brabec | 2006/0033226 A1 | 2/2006 | Wang |
| 2005/0195354 A1 | 9/2005 | Doane et al. | 2006/0036018 A1 | 2/2006 | Winey et al. |
| 2005/0203203 A1 | 9/2005 | Bonnet et al. | 2006/0036045 A1 | 2/2006 | Wilson et al. |
| 2005/0205265 A1 | 9/2005 | Todd et al. | 2006/0039848 A1 | 2/2006 | Matarredona et al. |
| 2005/0205860 A1 | 9/2005 | Hsu et al. | 2006/0040381 A1 | 2/2006 | Zhao et al. |
| 2005/0207963 A1 | 9/2005 | Tour et al. | 2006/0041050 A1 | 2/2006 | Manane et al. |
| 2005/0208328 A1 | 9/2005 | Hsu et al. | 2006/0041104 A1 | 2/2006 | Ait-Haddou et al. |
| 2005/0209388 A1 | 9/2005 | Hsu et al. | 2006/0045838 A1 | 3/2006 | Malenfant et al. |
| 2005/0211294 A1 | 9/2005 | Chittibabu et al. | 2006/0047052 A1 | 3/2006 | Barrera et al. |
| 2005/0212395 A1 | 9/2005 | Anazawa et al. | 2006/0051579 A1 | 3/2006 | Chokai et al. |
| 2005/0214196 A1 | 9/2005 | Ohashi et al. | 2006/0052509 A1 | 3/2006 | Saitoh et al. |
| 2005/0214197 A1 | 9/2005 | Gu et al. | 2006/0054488 A1 | 3/2006 | Harmon et al. |
| 2005/0214198 A1 | 9/2005 | Park et al. | 2006/0054555 A1 | 3/2006 | Sun |
| 2005/0214535 A1 | 9/2005 | Denes et al. | 2006/0054866 A1 | 3/2006 | Ait-Haddou et al. |
| 2005/0215718 A1 | 9/2005 | Rajagopalan et al. | 2006/0057016 A1 | 3/2006 | Kumar et al. |
| 2005/0218045 A1 | 10/2005 | Hannah | 2006/0057053 A1 | 3/2006 | Otobe et al. |

| | | |
|---|---|---|
| 2006/0057055 A1 | 3/2006 | Resasco et al. |
| 2006/0057290 A1 | 3/2006 | Glatkowski et al. |
| 2006/0057361 A1 | 3/2006 | Ounaies et al. |
| 2006/0058443 A1 | 3/2006 | Ohashi et al. |
| 2006/0062714 A1 | 3/2006 | Tang et al. |
| 2006/0062718 A1 | 3/2006 | Bahr et al. |
| 2006/0062924 A1 | 3/2006 | Horiuchi et al. |
| 2006/0062930 A1 | 3/2006 | Kumar et al. |
| 2006/0062985 A1 | 3/2006 | Karandikar |
| 2006/0065546 A1 | 3/2006 | Curodeau |
| 2006/0065887 A1 | 3/2006 | Tiano et al. |
| 2006/0067939 A1 | 3/2006 | Buzatu et al. |
| 2006/0067941 A1 | 3/2006 | Buzatu et al. |
| 2006/0069199 A1 | 3/2006 | Charati et al. |
| 2006/0073089 A1 | 4/2006 | Ajayan et al. |
| 2006/0081775 A1 | 4/2006 | Joyce et al. |
| 2006/0081882 A1 | 4/2006 | Malenfant et al. |
| 2006/0084742 A1 | 4/2006 | Ishida et al. |
| 2006/0084752 A1 | 4/2006 | Ounaies et al. |
| 2006/0094309 A1 | 5/2006 | Holtkamp et al. |
| 2006/0098389 A1 | 5/2006 | Liu et al. |
| 2006/0099135 A1 | 5/2006 | Yodh et al. |
| 2006/0099715 A1 | 5/2006 | Munoz et al. |
| 2006/0103641 A1 | 5/2006 | Marhefka et al. |
| 2006/0104886 A1 | 5/2006 | Wilson |
| 2006/0104890 A1 | 5/2006 | Harutyunyan et al. |
| 2006/0110537 A1 | 5/2006 | Huang et al. |
| 2006/0115640 A1 | 6/2006 | Yodh et al. |
| 2006/0115711 A1 | 6/2006 | Kim et al. |
| 2006/0116284 A1 | 6/2006 | Pak et al. |
| 2006/0121275 A1 | 6/2006 | Poulin et al. |
| 2006/0122284 A1 | 6/2006 | Rodriguez-Macias et al. |
| 2006/0122614 A1 | 6/2006 | Truckai et al. |
| 2006/0124028 A1 | 6/2006 | Huang et al. |
| 2006/0124613 A1 | 6/2006 | Kumar et al. |
| 2006/0126175 A1 | 6/2006 | Lu et al. |
| 2006/0127470 A1 | 6/2006 | Hirsch et al. |
| 2006/0131440 A1 | 6/2006 | Yen |
| 2006/0131570 A1 | 6/2006 | Meng |
| 2006/0135030 A1 | 6/2006 | Mao |
| 2006/0135281 A1 | 6/2006 | Palumbo et al. |
| 2006/0135282 A1 | 6/2006 | Palumbo et al. |
| 2006/0135677 A1 | 6/2006 | Huang et al. |
| 2006/0137817 A1 | 6/2006 | Ma et al. |
| 2006/0140847 A1 | 6/2006 | Yang et al. |
| 2006/0142148 A1 | 6/2006 | Ma et al. |
| 2006/0142149 A1 | 6/2006 | Ma et al. |
| 2006/0142466 A1 | 6/2006 | Tour et al. |
| 2006/0145194 A1 | 7/2006 | Barron et al. |
| 2006/0148642 A1 | 7/2006 | Ryu et al. |
| 2006/0151844 A1 | 7/2006 | Avouris et al. |
| 2006/0154195 A1 | 7/2006 | Mather et al. |
| 2006/0154489 A1 | 7/2006 | Tornow et al. |
| 2006/0159612 A1 | 7/2006 | Ziegler et al. |
| 2006/0159921 A1 | 7/2006 | Murthy et al. |
| 2006/0162818 A1 | 7/2006 | Kumar et al. |
| 2006/0165586 A1 | 7/2006 | Wong et al. |
| 2006/0165896 A1 | 7/2006 | Afzali-Ardakani et al. |
| 2006/0166003 A1 | 7/2006 | Khabashesku et al. |
| 2006/0167139 A1 | 7/2006 | Nelson et al. |
| 2006/0167147 A1 | 7/2006 | Asgari |
| 2006/0171874 A1 | 8/2006 | Khabashesku et al. |
| 2006/0172179 A1 | 8/2006 | Gu et al. |
| 2006/0174789 A1 | 8/2006 | Liebau et al. |
| 2006/0175581 A1 | 8/2006 | Douglas |
| 2006/0177946 A1 | 8/2006 | Dubin |
| 2006/0180755 A1 | 8/2006 | Chang et al. |
| 2006/0185714 A1 | 8/2006 | Nam et al. |
| 2006/0188723 A1 | 8/2006 | Rowley et al. |
| 2006/0188774 A1 | 8/2006 | Niu et al. |
| 2006/0189412 A1 | 8/2006 | Sullivan et al. |
| 2006/0192475 A1 | 8/2006 | Lee et al. |
| 2006/0193026 A1 | 8/2006 | Nagamura et al. |
| 2006/0193868 A1 | 8/2006 | Fisher et al. |
| 2006/0194058 A1 | 8/2006 | Amlani et al. |
| 2006/0199770 A1 | 9/2006 | Bianco et al. |
| 2006/0201880 A1 | 9/2006 | Ziegler et al. |
| 2006/0202168 A1 | 9/2006 | Barrera et al. |
| 2006/0205872 A1 | 9/2006 | Elkovitch |
| 2006/0207785 A1 | 9/2006 | Jow et al. |
| 2006/0210466 A1 | 9/2006 | Mitra et al. |
| 2006/0211236 A1 | 9/2006 | Bureau et al. |
| 2006/0211807 A1 | 9/2006 | Koning et al. |
| 2006/0214262 A1 | 9/2006 | Mosley et al. |
| 2006/0219689 A1 | 10/2006 | Huang et al. |
| 2006/0223991 A1 | 10/2006 | Zhang et al. |
| 2006/0228497 A1 | 10/2006 | Kumar et al. |
| 2006/0231399 A1 | 10/2006 | Smalley et al. |
| 2006/0233692 A1 | 10/2006 | Scaring et al. |
| 2006/0235113 A1 | 10/2006 | Dorgan et al. |
| 2006/0237217 A1 | 10/2006 | Glew |
| 2006/0237218 A1 | 10/2006 | Glew |
| 2006/0237219 A1 | 10/2006 | Glew |
| 2006/0237221 A1 | 10/2006 | Glew |
| 2006/0237693 A1 | 10/2006 | O'hara |
| 2006/0237708 A1 | 10/2006 | Choi et al. |
| 2006/0240305 A1 | 10/2006 | Huang |
| 2006/0249020 A1 | 11/2006 | Tonkovich et al. |
| 2006/0249711 A1 | 11/2006 | Niu et al. |
| 2006/0251568 A1 | 11/2006 | Fahlman |
| 2006/0252853 A1 | 11/2006 | Ajayan et al. |
| 2006/0257556 A1 | 11/2006 | Dai et al. |
| 2006/0257645 A1 | 11/2006 | Asaka et al. |
| 2006/0270777 A1 | 11/2006 | Wise et al. |
| 2006/0270790 A1 | 11/2006 | Corneau |
| 2006/0274049 A1 | 12/2006 | Spath et al. |
| 2006/0275371 A1 | 12/2006 | Dai et al. |
| 2006/0275596 A1 | 12/2006 | Payne et al. |
| 2006/0275956 A1 | 12/2006 | Konesky |
| 2006/0276056 A1 | 12/2006 | Ward et al. |
| 2006/0278444 A1 | 12/2006 | Binstead |
| 2006/0286023 A1 | 12/2006 | Huang |
| 2006/0286297 A1 | 12/2006 | Bronikowski et al. |
| 2006/0291142 A1 | 12/2006 | Grigorian et al. |
| 2006/0292297 A1 | 12/2006 | Mao et al. |
| 2006/0293434 A1 | 12/2006 | Yodh et al. |
| 2007/0003471 A1 | 1/2007 | Kawabata et al. |
| 2007/0004857 A1 | 1/2007 | Barraza et al. |
| 2007/0009379 A1 | 1/2007 | Bau et al. |

FOREIGN PATENT DOCUMENTS

| | | |
|---|---|---|
| EP | 1359121 | 11/2003 |
| EP | 1359169 | 11/2003 |
| EP | 1449887 | 8/2004 |
| JP | 20030138040 | 5/2003 |
| JP | 2003292801 | 10/2003 |
| JP | 2004002849 | 1/2004 |
| JP | 2004002850 | 1/2004 |
| JP | 2003096313 | 4/2004 |
| WO | WO99/57222 | 11/1999 |
| WO | WO00/44094 | 7/2000 |
| WO | WO01/30694 | 5/2001 |
| WO | WO01/57917 | 8/2001 |
| WO | WO02/16257 | 2/2002 |
| WO | WO 02/060812 A2 | 8/2002 |
| WO | WO 02/060812 A3 | 8/2002 |
| WO | WO02/076888 | 10/2002 |
| WO | WO02/088025 | 11/2002 |
| WO | WO02/095099 | 11/2002 |
| WO | WO2004/060988 | 7/2004 |

OTHER PUBLICATIONS

Yakobson, Boris I. et al., "Fullerene Nanotubes: $C_{1,000,000}$ and Beyond," American Scientist, 1997, vol. 85, 324-338.

Rinzler, A.G., "Large-scale purification and single-wall carbon nanotubes: process, product, and characterization, " Appl. Phys. A 67, 29-37 (1998).

Journet C., et al., "Large-scale production of single-walled carbon nanotubes by the electric-arc technique," Nature, vol. 388/Aug. 1997, 756-758.

Journet, C., et al., "Production of carbon nanotubes," Appl. Phys. A 67, 1-9 (1998).

Nikolaev, Pavel et al., "Gas-phase catalytic growth of single-walled carbon nanotubes from carbon monoside," Chemical Physics Letters 313 (1999) 91-97.

Liu, Jie et al., "Fullerene Pipes," Science, vol. 280, 1998, 1253-1256.

Stepanek, I. et al., "Nano-mechanical cutting and opening of single wall carbon nanotubes," Chemical Physics Letter 331 (2000) 125-131.

Szejtili, Jozsef, "Introduction and General Overview of Cyclodextrin Chemistry," Chem. Rev. 1998, 98, 1743-1753.

Chen, Jian et al., "Dissolution of Full-Length Single-Walled Carbon Nanotubes," J. Phys. Chem B 2001, 105, 2525-2528.

Niyogi, S. et al., "Chromatographic Purification of Soluble single-Walled Carbon Nanotubes (s-SWNTs)," J. Am. Chem. Soc., 2001, 123, 733-734.

Dresselhaus, M.S. et al., "Science of Fullereness and Carbon Nanotubes," 1996, San Diego: Academic Press, 901-908.

Bachtold et al., "Logic Circuits with Carbon Nanotube Transistors" Science 2001, 294, 1317-1320.

Banhart, "The Formation of a Connection Between Carbon Nanotubes in an Electron Beam," Nano Lett. 2001, 1, 329-332.

Chen, J. et al., "Room-Temperature Assembly of Directional Carbon Nanotube Strings," J. Am. Chem. Soc. 2002, 124, 758-759.

Cheng et al., "Noncovalent Functionalization and Solubilization of Carbon Nanotubes by Using Conjugated Zn-Porphyrin Polymer", Chem. Eur. J. 2006, 12, pp. 5053-5059.

Collins et al., "Engineering Carbon Nanotubes and Nanotube Circuits Using Electrical Breakdown", Science 2001, 292, 706-709.

Collins et al., "Extreme Oxygen Sensitivity of Electronic Properties of Carbon Nanotubes", Science 2000, 287, 1801-1804.

Craighead, "Nanoelectromechanical Systems", Science 2000, 290, 1532-1535.

Derycke et al., "Carbon Nanotube Inter-and Intramolecular Logic Gates", Nano Lett. 2001, 1, 453-456.

Dresselhaus, M.S. et al., "Science of Fullerenes and Carbon Nanotubes," 1966, San Diego: Academic Press, 870-917.

Franklin et al., "An Enhanced CVD Approach to Extensive Nanotube Networks with Directionality." Adv. Mater. 2000, 12, 890-894.

Gerdes et al., "Combing a Carbon Nanotube on a Flat-Insulator-Metal Nanojunction", Europhys. Lett., 1999, 48, (3), 292-298.

Haddon et al., "Chemistry of the Fullerenes: The Manifestation of Strain in a Class of Continuous Aromatic Molecules", Science, 1993, 261, 1545.

Haddon, R. C., "Magnetism of the carbon allotropes", Nature 1995, 378, 249-255.

Hamon et al., "Dissolution of Single-Walled Carbon Nanotubes", Advanced Materials, 1999, vol. 11, Issue 10, 834-840.

Holzinger et al., "Sidewall Functionalization of Carbon Nanotubes," Angew. Chem. Int. Ed. 2001, 40, 4002-4005.

Hornyak et al., "Template Synthesis of Carbon Nanotubes", Nanostructured Materials, Elsevier, New York, New York, US, vol. 12, No. 1-4, pp. 83-88, 1999.

Huang et al., "Directed Assembly of One-Dimensional Nanostructures into Functional Networks", Science 2001, 291, 630-633.

Kim et al., "Micromolding in Capillaries: Applications in Materials Science", J. Am. Chem. Soc. 1996, 118, 5722-5731.

Kong et al., "Nanotube Molecular Wires as Chemical Sensors", Science 2000, 287, 622-625.

Li et al., "Highly-Ordered Carbon Nanotube Arrays for Electronics Applications," Applied Physics Letters, American Institute of Physics, New York, US, vol. 75, No. 3, pp. 367-369, Jul. 19, 1999.

Martel, "Rings of Single-Walled Carbon Nanotubes", Nature, vol. 398, 1999, 299.

Mattson et al., "Molecular Functionalization of Carbon Nanotubes and Use as Substrates for Neuronal Growth", J. Molecular Neuroscience, 2000, 14, 175-182.

Messer et al., "Microchannel Networks for Nanowire Patterning", J. Am. Chem. Soc. 2000, 122, 10232-10233.

Patent Cooperation Treaty Application PCT/US2002/40789 International Patent Cooperation Treaty Search Report dated Apr. 14, 2003.

Schlittler et al., "Single Crystals of Single-Walled Carbon Nanotubes Formed by Self-Assembly", Science 2001, 292, 1136-1139.

Smith et al., "Formation Mechanism of Fullerene )Peapods and Coaxial Tubes: A Path to Large Scale Synthesis", Chem. Phys. Lett. 2000, 321, 169-174.

Sun, Y. et al., "Soluble Dendron-Functionalized Carbon Nanotubes: Preparation, Characterization, and Properties," Chem. Mater. 2001, 13, 2864-2869.

Tang et al., "Superconductivity in 4 Angstrom Single-Walled Carbon Nanotubes," Science 2001, 2462-2465.

Tasis et al., "Chemistry of Carbon Nanotubes", American Chemical Society, B Chemical Reviews, Published on the Web Feb. 23, 2006, pp. 1-32.

Tombler et al., "Reversible Electromechanical Characteristics of Carbon Nanotubes Under Local-Probe Manipulation", Nature 2000, 405, 769-772.

Waldeck, D. H., et al., "Nonradiative damping of molecular electronic excited states by metal surfaces," Surf. Sci. 1985, 158, 103.

Wu et al., "Synthesis of Carboxyl-Containing Conducting Oligomer and Non-Covalent Sidewall Functionalization of Single-Walled Carbon Nanotubes", Journal of Materials Chemistry, 2005, 15, pp. 1833-1873.

Zhang et al., "Electric-Field-Directed Growth of Aligned Single-Walled Carbon Nanotubes", Applied Physics Letters, vol. 79, No. 2001, 3155-3157.

Zhao et al., "Chromatographic Purification and Properties of Soluble Single-Walled Carbon Nanotubes," J. Am. Chem. Soc. 2001, 123, 11673-11677.

Ajayan, P. et al., "Single-Walled Carbon Nanotube-Polymer Composites: Strength and Weakness", Adv. Mater., (2000), vol. 12, No. 10, pp. 750-753, Wiley-VCH Verlag GmbH.

Andrews et al., "Fabrication of Carbon Multiwall Nanotube/Polymer Composites by Shear Mixing", Macromolecular Materials and Engineering, (2002), pp. 395-403, vol. 287, No. 6, Wiley-VCH Verlag GmbH.

Andrews, R. et al., "Nanotube Composite Carbon Fibers", Appl. Phys. Lett, (1999), pp. 1329-1331, vol. 75, No. 9, American Institute of Physics.

Ausman et al., "Organic Solvent Dispersions of Single-Walled Carbon Nanotubes: Toward Solutions of Pristine Nanotubes", Phys. Chem. B, 2000, 104, 8911-8915.

Bahr et al., "Functionalization of Carbon Nanotubes by Electrochemical Reduction of Aryl Diazonium Salts: A Bucky Paper Electrode", J Am. Chem. Soc. 2001, 123, 6536-6542.

Bahr, J. et al., "Dissolution of Small Diameter Single-Wall Carbon Nanotubes in Organic Solvents?", Chem. Commun. (2001), pp. 193-194, The Royal Society of Chemistry.

Barraza et al., "SWNT-Filled Thermoplastic and Elastomeric Composites Prepared by Miniemulsion Polymerization", Nano Letters, (2002), pp. 797-802, vol. 2, No. 8, American Chemical Society.

Baughman et al., "Carbon Nanotubes—the Route Toward Applications", Science, (2002), pp. 787-792, vol. 297, American Association for the Advancement of Science.

Baughman, R. et al., "Carbon Nanotube Actuators", Science, (1999). pp. 1340-1344, vol. 284, American Association for the Advancement of Science.

Berber et al., "Unusually High Thermal Conductivity of Carbon Nanotubes", Physical Review Letters, (2000), pp. 4613-4616, vol. 84, No. 20, The American Physical Society.

Biercuk et al., "Carbon Nanotube Composites for Thermal Management", Applied Physics Letters, (2002), pp. 2767-2769, vol. 80, No. 15, American Institute of Physics.

Blanchet et al., "Polyaniline Nanotube Composites: A High-Resolution Printable Conductor", Applied Physics Letters, (2003), pp. 1290-1292, vol. 82, No. 8, American Institute of Physics.

Boul et al., "Reversible Sidewall Functionalization of Buckytubes", Chem. Phys. Lett., 1999, 310, 367-372.

Brabec, C.J., et al,: "Photoactive Blends Of Poly(Para-Phenylenevinylene) (PPV) With Methanofullerenes From A Novel Precursor: Photophysics And Device Performance" Journal of Chemical Physics, vol. 105, Jan. 31, 2001, pp. 1528-1536.

Bunz, U., "Poly(aryleneethynylene)s: Synthesis, Properties, Structures, and Applications", Chem. Rev., (2002), pp. 1605-1644, vol. 100, American Chemical Society.

Calvert, P., "A Recipe for Strength," Nature, (1999), pp. 210-211, vol. 399, Macmillan Magazines Ltd.

Chen et al., "Cyclodextrin-Mediated Soft Cutting of Single-Walled Carbon Nanotubes" J. Am. Chem. Soc. 2001, 123, 6201-6202.

Chen et al., "Noncovalent Engineering of Carbon Nanotube Surfaces by Rigid, Functional Conjugated Polymers", Journal of American Chemical Society, (2002), pp. 9034-9035, vol. 124, No. 131, American Chemical Society.

Chen et al., "Solution Properties of Single-Walled Carbon Nanotubes", Science 1998, vol. 282, pp. 95-98.

Chen et al., Supporting Information for "Noncovalent Engineering of Carbon Nanotubes Surface by Rigid, Functional Conjugated Polymers", (2002), pp. S1-S7.

Chen, J. et al., "Noncovalent Engineering of Carbon Nanotube Surfaces", Nanotech 2004 Conference Technical Program Abstract, Summary and Power Point Slides, Mar. 7-11, 2004, Boston, 2004 NSTI Nanotechnology Conference and Trade Show.

Chen, J., Presentation at 227th ACS National Meeting entitled "Noncovalent Engineering of Carbon Nanotube Surfaces", Anaheim, California, Mar. 31, 2004. (subject matter was identical to above entry).

Chen, R. et al., "Noncovalent Sidewall Functionalization of Single-Walled Carbon Nanotubes for Protein Immobilization", J. Am. Chem. Soc., (2001), pp. 3838-3839, vol. 123, American Chemical Society.

Chen, Y., et al., "Mechanochemical Synthesis of Boron Nitride Nanotubes", Materials Science Forum, (1999), pp. 173-177; vols. 312-314 and Journal of Metastable and Nanocrystalline Materials, (1999), pp. 173-177, vol. 2-6, Trans Tech Publications.

China Application No. 03136785.2, Office Action and translation thereof dated Dec. 17, 2004.

China Application No. 03136786.0, Office Action and translation thereof dated Jan. 21, 2005.

Coleman et al., "Percolation-Dominated Conductivity in a Conjugated-Polymer-Carbon-Nanotube Composite", Physical Review B, (1998), pp. R7492-R7495, vol. 58, No. 12, The American Physical Society.

Dalton et al., "Selective Interaction of a Semiconjugated Organic Polymer with Single-Wall Nanotubes", J. Phys. Chem. B., (2000), pp. 10012-10016, vol. 104, No. 43, American Chemical Society.

Diehl et al., "Self-Assembled, Deterministic Carbon Nanotube Wiring Networks," Chem. Int. Ed. 2002, 41, 353-356.

Ebbesen, T., "Cones and Tubes: Geometry in the Chemistry of Carbon", Acc. Chem. Res., (1998), pp. 558-566, vol. 31, American Chemical Society.

Erdogan et al. Synthesis and Mesoscopic Order of a Sugar-Coated Poly (p-phenyleneethynylene)), Macromolecules (2002), pp. 7863-7864, American Chemical Society.

European Patent Application No. 03252761.6, Search Report dated Sep. 29, 2003.

European Patent Application No. 03252762.4, Search Report dated Sep. 18, 2003.

Garboczi et al., "Geometrical Percolation Threshold of Overlapping Ellipsoids", Physical Review E, (1995), pp. 819-828, vol. 52, No. 1, The American Physical Society.

Georgakilas, V. et al., "Organic Functionalization of Carbon Nanotubes", J. Am. Chem. Soc., (2002), pp. 760-761, vol. 124, No. 5, American Chemical Society.

Haddon, "Electronic Properties of Carbon Toroids," Nature, 1997, 388, 31-32.

Han, W. et al., "Synthesis of Boron Nitride Nanotubes from Carbon Nanotubes by a Substitution Reaction", Applied Physics Letters, (1998), pp. 3085-3087, vol. 73, No. 21, American Institute of Physics.

Harper, C., "Appendix D—Electrical Properties of Resins and Compounds", Handbook of Plastics, Elastomers, and Composites, 4th Edition, (2002), pp. 861-863, McGraw-Hill.

Hirsch A.: "Functionalization of Single-Walled Carbon Nanotubes" Angewandte Chemie. International Edition, Verlag Chemie. Weinheim, DE, vol. 41, No. 11, 2002, pp. 1853-1859.

Iijima et al., "Structural Flexibiltiy of Carbon Nanotubes", J. Chem. Phys., 1996, 104, No. 5, 2089-2092.

Japanese Application JP2003-127114, Translation of Japanese Office Action dated Nov. 30, 2004.

Japanese Application JP2003-127132, Translation of Japanese Office Action dated Nov. 30, 2004.

Kilbride et al., "Experimental Observation of Scaling Laws for Alternating Current and Direct Current Conductivity in Polymer-Carbon Nanotube Composite Thin Films", Journal of Applied Physics, (2002), pp. 4024-4030, vol. 92, No. 7, American Institute of Physics.

Kim et al., "Ion-Specific Aggregation in Conjugated Polymers: Highly Sensitive and Selective Fluorescent Ion Chemosensors", Angew. Chem. Int. Ed. (2000), pp. 3868-3872, Wiley-VCH Verlag GmbH.

Koishi et al., "Synthesis and Non-Linear Optical Properties of 1,3-and 1,4-disubstituted type of poly(phenyleneethynylene)s containing electron-donor and acceptor group", Macromol. Chem. Phys. 201, 2000, pp. 525-532.

Korean Application 29184/2003, Korean Office Action and translation thereof dated Apr. 30, 2005.

Korean Application 29184/2003, Korean Office Action and translation thereof dated Aug. 19, 2005.

Korean Application 29185/2003, Korean Office Action and translation thereof dated Aug. 19, 2005.

Korean Patent Application 29185/2003, Korean Office Action dated Feb. 17, 2006.

Krishnan et al., "Young's Modulus of Single-Walled Nanotubes", Physical Review B, (1998), pp. 14013-14019, vol. 58, No. 20, The American Physical Society.

Kuroda et al., "Synthesis Of A Nonionic Water Soluble Semiconductive Polymer", Chem. Commun., 2003, 26-27.

Lakowicz et al., "Radiative Decay Engineering: Biophysical and Biomedical Applications," Analytical Biochemistry, 2001, 298, 1-24.

Liu et al., "Controlled Deposition of Individual Single-Walled Carbon Nanotubes on Chemically Functionalized Templates", Chem. Phys. Lett., 1999, 303, 125-129.

McQuade, D. et al., "Signal Amplification of a 'Turn-on' Sensor: Harvesting the Light Captured by a Conjugated Polymer", J. Am. Chem. Soc., (2000), pp. 12389-12390, vol. 122; and Supplementary Materials, pp. S1-S7, American Chemical Society.

Mickelson et al., "Solvation of Fluorinated Single-Wall Carbon Nanotubes in Alcohol Solvents", Phys. Chem. B, 1999, 103, 4318-4322.

Miller, B., "Tiny Graphite 'Tubes' Create High-Efficiency Conductive Plastics", Plastics World, (1996), pp. 73-77, publisher unknown.

Moroni et al., "Rigid Rod Conjugated Polymers for Non-Linear Optics. 1. Characterization and Linear Optical Properties of Poly(aryleneethynylene) Derivatives", American Chemical Society, 1994, vol. 27, No. 2, pp. 562-571.

Moroni, M. et al., "Rigid Rod Conjugated Polymers for Nonlinear Optics. 3. Intramolecular H Bond Effects on Poly(phenyleneethynylene) Chains", Macromolecules, (1997), pp. 1964-1972, vol. 30, American Chemical Society.

O'Connell, M. et al., "Reversible water-solubilization of single-walled carbon nanotubes by polymer wrapping", Chemical Physics Letters, (2001), pp. 265-271, vol. 342, Elsevier Science B.V.

Oh et al., "Stability And Cap Formation Mechanism Of Single-Walled Carbon Nanotubes", Phys. Rev. B, 1998. 58, No. 11, 7407-7411.

Park et al., "Dispersion of Single Wall Carbon Nanotubes by in Situ Polymerization Under Sonication", Chemical Physical Letters, (2002)., pp. 303-308, vol. 364, Elsevier Sciences B.V.

Patent Cooperation Treaty Application PCT/US2004/016226 International Patent Cooperation Treaty Search Report and Written Opinion dated Jan. 14, 2005.

Patent Cooperation Treaty Application PCT/US2005/012717International Patent Cooperation Treaty Search Report and Written Opinion dated Sep. 22, 2005.

Pötschke et al., "Rheological Behavior of Multiwalled Carbon Nanotube/Polycarbonate Composites", Polymer, (2002), pp. 3247-3255, vol. 43, Elsevier Science Ltd.

Ramasubramaniam et al., "Homogenous Carbon Nanotube/Polymer Composites for Electrical Applications", Applied Physics Letters, (2003), pp. 2928-2930, vol. 83, No. 14, American Institute of Physics.

Rappe et al., "UFF, a Full Periodic Table Force Field for Molecular Mechanics and Molecular Dynamics Simulators", J. Am. Chem. Soc. 1992, 114, 100024.

Riggs et al., "Strong Luminescence of Solubilized Carbon Nanotubes", J. Am. Chem. Soc. 2000, 122, 5879-5880.

Roncali, "Synthetic Principles for Bandgap Control in Linear .pi.-Conjugated Systems", Chem. Rev. 1997, 97, pp. 173-205.

Rutkofsky et al., "Using a Carbon Nanotube Additive to Make a Thermally and Electrically Conductive Polyurethane", 9711 Zyvex Application Note, (May 5, 2004), Zyvex Corporation.

Rutkofsky et al., "Using a Carbon Nanotube Additive to Make Electrically Conductive Commercial Polymer Composites", 9709 Zyvex Application Note, (Mar. 19, 2004), Zyvex Corporation.

Schadler, L. et al., "Load transfer in carbon nanotube epoxy composites", Applied Physics Letters, (1998), pp. 3842-3844.vol. 73, No. 26.

Shultz, D. et al., "A Modified Procedure for Sonogashira Couplings: Synthesis and Characterization of a Bisporphyrin, 1,1-Bis[zinc(II) 5'-ethynyl-10', 15',20'-trimesitylporphyrinyl]methylenecyclohexane", J. Org. Chem., (1998), pp. 4034-4038, vol. 63, American Chemical Society.

Sonogashira, K., et al., "A Convenient Synthesis of Acetylenes: Catalytic Substitutions of Acetylenic Hydrogen With Bromoalkenes, Iodoarenes, and Bromopyridines", Tetrahedron Letters, (1975), pp. 4467-4470. No. 50., Pergamon Press, GB.

Srivastava et al., "Predictions of Enhanced Chemical Reactivity at Regions of Local Conformation Strain on Carbon Nanotubes: Kinky Chemistry", J. Phys. Chem. B., 1999, 103, 4330-4337.

Star et al., "Preparation and Properties of Polymer-Wrapped Single-Walled Carbon Nanotubes", Angew. Chem. Int. Ed., (2001), pp. 1721-1725, vol. 40, No. 9, Wiley-VCH Verlag GmbH.

Sutton et al., "On the morphology and growth of electrochemically polymerized polypyrrole". Polymer, vol. 36, No. 9, pp. 1849-1857, 1995.

Tang et al., "Preparation, Alignment, and Optical Properties of Soluble Poly (Phenylacetylene)-Wrapped Carbon Nanotubes", Macromolecules 1999, 32, 2569-2576.

Taylor et al., "Synthesis and Characterization of Poly (p-phenylene)s with Nonlinear Optical Side Chains", Macromolecules 2000, 33, pp. 2355-2358.

Watts et al., "The Complex Permittivity of Multi-Walled Carbon Nanotubes—Polystyrene Composite Films in X-Band", Chemical Physics Letters, (2003), pp. 609-614, vol. 378, Elsevier B.V.

Wong et al., "Covalently-Functionalized Single-Walled Carbon Nanotube Probe Tips for Chemical Force Microscopy", J. Am. Chem. Soc., 1998, 120. 8557-8558.

Yamamoto et al., "Preparation of Pi-Conjugated Polymers Composed of Hydroquinone, p-Benzoquinone, and p-Diacetoxyphenylene Units. Opitcal Redox Properties of the Polymers", Macromolecules, American Chemical Society, 1999, 32, 5556-8896.

Yang et al., "Efficient Blue Polymer Light-Emitting Diodes From A Series Of Soluble Poly(Paraphenylene)S", Journal of Applied Physics—Jan. 15, 1996—vol. 79, Issue 2, pp. 934-939.

Zhou, Q., et al., "Fluorescent Chemosensors Based on Energy Migration in Conjugated Polymers: The Molecular Wire Approach to Increased Sensitivity", J. Am. Chem. Soc., (1995), pp. 12593-12602, vol. 117, American Chemical Society.

Zyvex Corporation, Carbon Nanotube Functionalization benefits On-line Product Display, Zyvex Dried Film, (2003), Zyvex Corporation, (http://www.zyvex.com/products/zdf_benefits.html.

Zyvex Corporation, Carbon Nanotube Functionalization Faqs On-line Product Display, (2003), Zyvex Corporation (http://www.zyvex.com/products/cnt_faqs_2.html).

Zyvex Corporation, Carbon Nanotube Functionalization Features On-line Product Display, Zyvex Dried Film, (2003), Zyvex Corporation. (http://www.zyvex.com/products/zdf_features.html.

Zyvex Corporation, Carbon Nanotube Functionalization specifications—Zyvex Dried Film On-line Product Display, (2003), Zyvex Corporation (http://www.zyvex.com/products/zdf_specs.html.

Dresselhaus, M.S. et al., *Science of Fullerenes and Carbon Nanotubes*, 1996, San Diego: Academic Press, 870-917.

U.S. Appl. No. 60/780,606, "Methods for Preparing Carbon Nanotube Coatings", (no date).

U.S. Appl. No. 60/780,631, "Dispersing Carbon Nanotubes in Organic Solvent", (no date).

U.S. Appl. No. 60/780,607, "Flexible Transparent Conductive Coatings Based on Carbon Nanotubes", (no date).

European Patent Examination Report from European Patent Application No. 03252762.4, dated Jun. 26, 2007.

* cited by examiner

SYSTEM AND METHOD FOR MANIPULATING NANOTUBES

CROSS-REFERENCE TO RELATED APPLICATIONS

This application is a divisional of prior U.S. application Ser. No. 10/044,317, filed Jan. 11, 2002, now U.S. Pat. No. 6,723,299, the entire disclosure of which is hereby incorporated herein by reference, which itself claims the benefit of U.S. Provisional Application No. 60/291,101, filed May 17, 2001, the entire disclosure of which is hereby incorporated herein by reference.

TECHNICAL FIELD

The present invention is related to manipulating nanotubes, and more particularly to a system and method that utilize organic material, such as cyclodextrin, to manipulate nanotubes, such as carbon nanotubes, by, for example, dispersing and/or cutting the nanotubes.

BACKGROUND

A carbon nanotube can be visualized as a sheet of hexagonal graph paper rolled up into a seamless tube and joined. Each line on the graph paper represents a carbon-carbon bond, and each intersection point represents a carbon atom.

In general, carbon nanotubes are elongated tubular bodies, which are typically only a few atoms in circumference. The carbon nanotubes are hollow and have a linear fullerene structure. The length of the carbon nanotubes potentially may be millions of times greater than their molecular-sized diameter. Both single-walled carbon nanotubes (SWNTs), as well as multi-walled carbon nanotubes (MWNTs) have been recognized see "Nanotubes from Carbon" by P. M. Ajayan, Chem. Rev. 1999, 99, 1787-1799, the disclosure of which is hereby incorporated herein by reference).

Carbon nanotubes are currently being proposed for a number of applications since they possess a very desirable and unique combination of physical properties relating to, for example, strength and weight. Carbon nanotubes have also demonstrated electrical conductivity. See Yakobson, B. I., et al., *American Scientist*, 85, (1997), 324-337; and Dresselhaus, M. S., et al., Science of Fullerenes and Carbon Nanotubes, 1996, San Diego: Academic Press, pp. 902-905. For example, carbon nanotubes conduct heat and electricity better than copper or gold and have 100 times the tensile strength of steel, with only a sixth of the weight of steel. Carbon nanotubes may be produced having extraordinarily small size. For example, carbon nanotubes are being produced that are approximately the size of a DNA double helix (or approximately $1/50,000^{th}$ the width of a human hair).

Considering the excellent properties of carbon nanotubes, they are well suited for a variety of uses, from the building of computer circuits to the manufacturing of heat-reflective material, and even to the delivery of medicine. As a result of their properties, carbon nanotubes may be useful in microelectronic device applications, for example, which often demand high thermal conductivity, small dimensions, and light weight. Perhaps most promising is their potential to act as nano-wires and even tiny transistors in ultradense integrated circuits. One potential application of carbon nanotubes that has been recognized is their use in flat-panel displays that use electron field-emission technology (as carbon nanotubes generally make excellent pipes for the high-energy electrons). Further potential applications that have been recognized include electromagnetic shielding, such as for cellular telephones and laptop computers, radar absorption for stealth aircraft, nano-electronics (including memories in new generations of computers), and use as high-strength, lightweight composites. Further, carbon nanotubes are potential candidates in the areas of electrochemical energy storage systems (e.g., lithium ion batteries) and gas storage systems.

Various techniques for producing carbon nanotubes have been developed. As examples, methods of forming carbon nanotubes are described in U.S. Pat. Nos. 5,753,088 and 5,482,601, the disclosures of which are hereby incorporated herein by reference. The three most common techniques for producing carbon nanotubes are: 1) laser vaporization technique, 2) electric arc technique, and 3) gas phase technique (e.g., HIPCO™ process), which are discussed further below.

In general, the "laser vaporization" technique utilizes a pulsed laser to vaporize graphite in producing the carbon nanotubes. The laser vaporization technique is further described by A. G. Rinzler et al. in *Appl. Phys. A*, 1998, 67, 29, the disclosure of which is hereby incorporated herein by reference. Generally, the laser vaporization technique produces carbon nanotubes that have a diameter of approximately 1.1 to 1.3 nanometers (nm). Such laser vaporization technique is generally a very low yield process, which requires a relatively long period of time to produce small quantities of carbon nanotubes. For instance, one hour of laser vaporization processing typically results in approximately 100 milligrams of carbon nanotubes.

Another technique for producing carbon nanotubes is the "electric arc" technique in which carbon nanotubes are synthesized utilizing an electric arc discharge. As an example, single-walled nanotubes (SWNTs) may be synthesized by an electric arc discharge under helium atmosphere with the graphite anode filled with a mixture of metallic catalysts and graphite powder (Ni:Y;C, as described more fully by C. Journet et al. in *Nature* (London), 388 (1997), 756. Typically, such SWNTs are produced as close-packed bundles (or "ropes") with such bundles having diameters ranging from 5 to 20 nm. Generally, the SWNTs are well-aligned in a two-dimensional periodic triangular lattice bonded by van der Waals interactions. The electric arc technique of producing carbon nanotubes is further described by C. Journet and P. Bernier in *Appl. Phys. A*, 67, 1, the disclosure of which is hereby incorporated herein by reference. Utilizing such an electric arc technique, the average carbon nanotube diameter is typically approximately 1.3 to 1.5 nm and the triangular lattice parameter is approximately 1.7 nm. As with the laser vaporization technique, the electric arc production technique is generally a very low yield process that requires a relatively long period of time to produce small quantities of carbon nanotubes. For instance, one hour of electric arc processing typically results in approximately 100 milligrams of carbon nanotubes.

Thus, both the laser vaporization technique and electric arc technique can only produce small quantities of SWNTs, See A. G. Rinzler et al, *Appl. Phys. A*, 1998, 67, 29-37; C. Journey and P. Bernier, *Appl. Phys. A*, 1998, 67, 1-9. More recently, Richard Smalley and his colleagues at Rice University have discovered another process, the "gas phase" technique, which produces much greater quantities of carbon nanotubes than the laser vaporization and electric arc production techniques. The gas phase technique, which is referred to as the HIPCO process, produces carbon nanotubes utilizing a gas phase catalytic reaction. The HIPCO process uses basic industrial gas (carbon monoxide) under temperature and pressure conditions common in modern industrial plants to create relatively high quantities of high-purity carbon nanotubes that are essentially free of by-products. The HIPCO process is described in further detail by P. Nikolaev et al. in *Chem. Phys. Lett.*, 1999, 313, 91, the disclosure of which is hereby incorporated herein by reference.

While daily quantities of carbon nanotubes produced using the above-described laser vaporization and electric arc techniques are approximately 1 gram per day, the HIPCO process may enable daily product of carbon nanotubes in quantities of a pound or more. Generally, the HIPCO technique produces carbon nanotubes that have relatively much smaller diameters than are typically produced in the laser vaporization or electric arc techniques. For instance, the nanotubes produced by the HIPCO technique generally have diameters of approximately 0.7 to 0.8 nanometer (nm).

Carbon nanotubes are commonly produced (e.g., using the above-described techniques) in relatively long, highly tangled ropes. For example, SWNTs produced by the HIPCO process (which are available from Carbon Nano-technologies,. Inc.) generally comprise relatively long (e.g., >4 micrometers ($\mu$m)) and relatively thick (e.g., 20-100 nm) ropes formed by a plurality of highly tangled carbon nanotubes.

A desire often exists for a nanotube structure that is shorter than the relatively long tubes commonly produced. Shortened single-walled carbon nanotubes (e.g., SWNTs having length $\leq 1$ $\mu$m) will have a rich chemistry due to their higher chemical processability. For example, shortened SWNTs can be further sorted by length, chemically functionalized, solubilized and chromatographically purified (J. Liu et al, *Science* 1998, 11, 834-840; S. Niyogi et al, *J. Am. Chem. Soc.* 2001, 123, 733-734). Accordingly, such shortened SWNTs are the fitting subjects of a new branch of organic chemistry, a molecular nanotechnology of great promise. Processable shortened SWNTs can be further polymerized and copolymerized to form nanotube-based polymer composites and copolymers which will find applications in the areas of electromagnetic shielding coatings for military aircraft and ships as well as mobile telephones (e.g., cellular telephones) and laptops, antistatic coatings (e.g., for automobiles), and organic thin film devices for micro-electronics and micro-optoelectronics. Shortened SWNT materials, due to their high density of open ends, will also find applications in electrochemical energy storage systems for lithium batteries and hydrogen storage systems for fuel cells. In addition, shortened SWNTs, after appropriate conversion (solubilization, exfoliation and chemical functionalization), are promising one-dimensional building blocks for constructing advanced nanoscale structures which may find important applications in molecular electronics.

Various techniques have been proposed for shortening (or "cutting") carbon nanotubes to result in nanotubes having a length shorter than that at which the nanotubes are produced. One technique for shortening the length of carbon nanotubes utilizes prolonged sonication of carbon nanotubes to a mixture of concentrated sulfuric and nitric acids, as described more fully in "Fullerene Pipes" by Jie Liu et al. published in *Science*, volume 280 (pages 1253-1256) on May 22, 1998, the disclosure of which is hereby incorporated herein by reference. Liu et al. found that the length distribution of the carbon nanotubes exposed to the concentrated sulfuric and nitric acids shortened systematically with exposure time to the acid.

One disadvantage of Liu et al's method is that the yield of shortened SWNTs is low. The total yield (after shortening and polishing steps) is approximately 30% or less, thus only a small amount of usable shortened carbon nanotubes can be obtained from the purified SWNTs using such acid-cutting technique. Also, while this acid-cutting technique does effectively shorten the length of carbon nanotubes having relatively large diameters (e.g. the SWNTs produced by laser vaporization or electric arc production techniques), it is not a suitable solution for shortening SWNTs having smaller diameters, such as those typically produced by the HIPCO process (e.g., approximately 0.7 to 0.8 nm diameter). Because of the higher chemical reactivity due to strain in small diameter nanotubes, it appears that the acid-cutting technique may not be suitable for cutting such small diameter SWNTs. For example, after 12 hour sonication of 10 mg of SWNTs (produced by the HIPCO process) in 12 ml of 3:1 mixture of concentrated sulfuric acid ($H_2SO_4$)/nitric acid ($HNO_3$), it was found by transmission electron microscopy (TEM) that most of such small-diameter SWNTs were severely damaged.

Another proposed technique for shortening the length of carbon nanotubes utilizes diamond particles as an abrasive material for cutting such carbon nanotubes, as described more fully in "Nano-mechanical cutting and opening of single wall carbon nanotubes" by 1. Stepanek et al. in *Chem. Phys. Lett.*, 2000, 331, 125-131, the disclosure of which is hereby incorporated herein by reference. In such technique, diamond particles are used to effectively grind the carbon nanotubes in order to cut them into shortened nanotubes. This technique has a better yield than the above-described acid-cutting technique. However, it would be very difficult to separate the shortened SWNTs from the small diamond particles, because both materials are insoluble in organic or inorganic solvents.

BRIEF SUMMARY OF THE INVENTION

The present invention is directed to a system and method that allow for manipulation of nanotubes. More specifically, embodiments of the present invention enable various types of manipulation of nanotubes utilizing an organic material that is presented to the nanotubes. For example, a preferred embodiment of the present invention enables cutting of nanotubes into shortened nanotubes. As another example, certain embodiments enable dispersing of a plurality of nanotubes. As yet another example, certain embodiments enable dissolution of nanotubes. As still another example, certain embodiments enable noncovalent functionalization of nanotubes with an organic material presented thereto. Thus, one or more of various different types of nanotube manipulation may be enabled by embodiments of the present invention, including, without limitation, cutting nanotubes, dispersing nanotubes, dissolution of nanotubes, and noncovalently functionalizing nanotubes.

According to one embodiment of the present invention, the organic material utilized in manipulating (e.g., cutting, dispersing, etc.) nanotubes comprises a soft organic material. According to another embodiment of the present invention, a soluble organic material is utilized for manipulating nanotubes. According to yet another embodiment of the present invention, a soft organic material that is soluble is utilized for manipulating nanotubes. According to still another embodiment, an organic material that acts as a dispersing reagent for dispersing nanotubes is utilized for manipulating (e.g., dispersing, cutting, etc.) nanotubes. In a preferred embodiment, the organic material utilized for manipulating nanotubes comprises cyclodextrin.

A preferred embodiment enables a process for cutting nanotubes that uses an organic material. In such cutting process of a preferred embodiment, an organic material is presented to the nanotubes, and a mechanical force is then applied to the nanotubes to result in cutting of at least one of the nanotubes. Most preferably, the organic material (e.g., cyclodextrin) utilized in the cutting process is soluble to enable the resulting shortened nanotubes to be easily separated from such organic material.

According to one embodiment of the present invention, a method for cutting nanotubes comprises exposing at least one nanotube having a first length to a soft organic material, and grinding the nanotube with the soft organic material to result in at least one shortened nanotube having a length that is shorter than the first length.

According to another embodiment of the present invention, a method for manipulating nanotubes comprises obtaining a nanotube rope that comprises a plurality of nanotubes, and presenting a solid-state nanotube dispersing reagent to the nanotube rope to disperse at least a portion of the plurality of nanotubes.

According to another embodiment of the present invention, a method for dissolution of nanotubes comprises presenting a nanotube-dispersing reagent to a plurality of nanotubes in at least one solvent, and using the nanotube-dispersing reagent to disperse at least a portion of the plurality of nanotubes.

According to another embodiment of the present invention, a method for functionalization of nanotubes comprises presenting an organic material to a plurality of nanotubes, and the organic material selectively noncovalently functionalizing at least one of the plurality of nanotubes based at least in part on nanotube diameter size.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Various embodiments of the present invention are now described with reference to the above figures. Certain embodiments of the present invention enable use of soft organic materials, such as cyclodextrins, for shortening the length of (or "cutting") nanotubes. Generally, a "nanotube" is a tubular, strand-like structure that has a circumference on the atomic scale. The diameter of such a nanotube typically ranges from approximately 0.4 nm to approximately 100 nm, and most typically have diameters ranging from approximately 0.7 nm to approximately 5 nm (e.g., when produced utilizing the above-described common production techniques).

The nanotube may be formed from various materials such as, for example, carbon, boron nitride, and composites thereof. Nanotubes are typically formed from carbon. As described above, nanotubes are commonly formed as a fullerene molecule containing a hexagonal lattice structure. The nanotubes may be single-walled nanotubes or multi-walled nanotubes. As an example, single-walled carbon nanotubes (SWNTs) may be cut using soft organic materials in accordance with certain embodiments of the present invention. As a further example, multi-walled carbon nanotubes (MWNTs) may be cut using such materials in accordance with certain embodiments of the present invention. A preferred embodiment is utilized for cutting carbon nanotubes, and most preferably single-walled carbon nanotubes (SWNTs). Although, certain embodiments may be utilized for cutting various other types of nanotubes, including without limitation multi-walled carbon nanotubes (MWNTs). As used herein, "nanotubes" are not limited solely to carbon nanotubes. Rather, the term "nanotubes" is used broadly herein and, unless otherwise qualified, is intended to encompass any type of nanotube now known or later developed.

Figure 1:
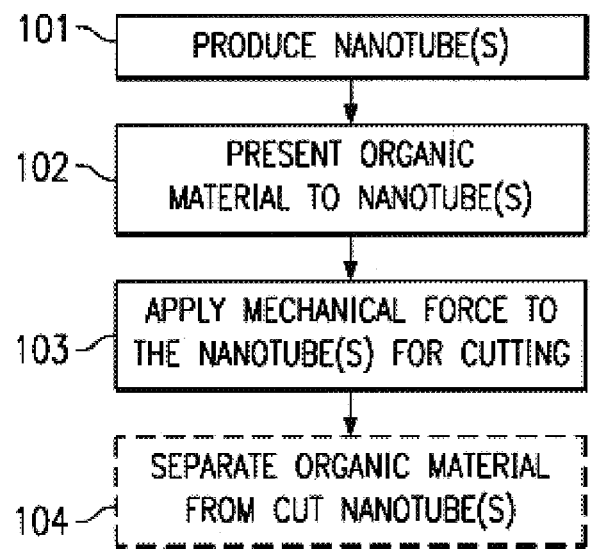
FIG. 1 shows an exemplary nanotube cutting process of a preferred embodiment.

While embodiments of the present invention have applicability other than or in addition to cutting nanotubes (as described further below), a preferred embodiment is applicable for cutting nanotubes. Turning to FIG. 1, an exemplary cutting process 100 in accordance with a preferred embodiment of the present invention is shown. In step 101, nanotubes are produced through some method now known or later developed. As described above, nanotubes are commonly produced by such techniques as laser vaporization, electric arc, and gas phase catalytic reaction as individual nanotubes and/or ropes that comprise a plurality of individual nanotubes. Generally, the nanotubes, as produced by such techniques, have lengths much greater than their diameters (e.g., the length of a nanotube may be millions of times greater than its diameter).

For example, the above-described laser vaporization technique generally produces nanotubes having a diameter ranging from approximately 1.1 nm to approximately 1.3 nm, and the above-described electric arc technique generally produces nanotubes having a diameter ranging from approximately 1.3 nm to approximately 1.5 nm. As another example, the above-described gas phase process generally produces nanotubes having a diameter ranging from approximately 0.7 nm to approximately 0.8 nm. Also, the nanotubes, as produced, generally have a relatively long length compared to their diameter. For example, as produced, the nanotubes may have a length of greater than 4 μm. Embodiments of the present invention enable the lengths of such nanotubes to be shortened by effectively cutting them.

In step 102 of the exemplary cutting process 100, an organic material is presented to the nanotubes. According to one embodiment of the present invention, a soft organic material is utilized for cutting the nanotubes. As used herein, "soft materials" are those materials softer than diamond, unless otherwise qualified. According to another embodiment of the present invention, a soluble organic material is utilized for cutting the nanotubes. According to yet another embodiment of the present invention, a soft organic material that is soluble is utilized for cutting the nanotubes. According to still another embodiment, a material that acts as a dispersing reagent for dispersing nanotubes is utilized for cutting such nanotubes. As described further below, in a preferred embodiment, the material utilized for cutting nanotubes comprises cyclodextrin.

In a preferred embodiment, cyclodextrin is utilized as the soft, organic material for cutting nanotubes. However, in other embodiments other similar soft (and/or soluble) organic materials may be utilized, such as any material comprising at least one glucopyranose unit, any material comprising at least one monosaccharide unit, any material comprising at least one cyclic oligosaccharides, any material comprising at least one cyclic polysaccharides, any material comprising at least one linear oligosaccharides, any material comprising at least one branched oligosaccharides, any material comprising at least one linear polysaccharides, and any material comprising at least one branched polysaccharides.

In embodiments of the present invention, the soft and/or soluble organic material is presented to individual nanotubes and/or nanotube ropes, and a mechanical force is then applied, in step 103, to the material and nanotubes to result in cutting of at least one of the nanotubes. More specifically, a grinding force may be utilized to grind the nanotubes with the soft and/or soluble organic material to effectively perform mechanical cutting of the nanotubes. For ease of explanation and consistency with a preferred embodiment of the present invention, such soft and/or soluble organic material may be referred to hereafter in describing aspects of a preferred embodiment as cyclodextrin; although, it should be understood that the scope of the present invention is not intended to be so limited.

As described above, grinding of nanotubes with hard diamond particles in order to cut the nanotubes has been proposed by Stepanek et al. Considering that diamond is such a hard material, it is not surprising that diamond particles are capable of cutting the nanotubes. However, in accordance with embodiments of the present invention, it is recognized, unexpectedly, that certain soft materials and/or soluble materials, such as cyclodextrins, may be used to effectively cut the nanotubes.

In step 104 of process 100, which is optional in a preferred embodiment, the organic material presented in step 102 is separated from the cut nanotubes. Most preferably, the organic material (e.g., cyclodextrin) utilized in the cutting process is soluble to enable the resulting shortened nanotubes to be easily separated from such organic material. In the above-described mechanical cutting process that uses diamonds as the abrasive material for cutting nanotubes, difficulty may be encountered separating the resulting shortened nanotubes from the diamond particles because both materials are insoluble. However, in certain embodiments of the present invention, the organic material utilized is soluble, which enables easy separation of the shortened nanotubes from such material. For instance, cyclodextrins are soluble in water, while nanotubes are generally insoluble. Thus, the mixture of shortened nanotubes and cyclodextrins remaining after the cutting process of a preferred embodiment may be washed with water to separate the shortened nanotubes from the cyclodextrins. Preferably, the shortened nanotubes resulting from the cutting process of a preferred embodiment have the same diameter as they had before the cutting process. Further, it should be recognized that the cutting process preferably has a 100% yield. That is, potentially, all of the nanotube material remains after the cutting process.

The environmentally benign solid-state grinding process of a preferred embodiment can be scaled up easily at low cost (e.g., scaling-up by any types of milling and grinding technologies), which will enable commercial production of shortened nanotubes ($\leq 1$ μm) in large scale. The solid-state process of a preferred embodiment avoids not only sonication in hazardous strong acids and oxidants, which can damage the small diameter nanotubes, but also avoids lengthy sonication in any solvent, thereby enabling the process to be easily scaled up.

According to a preferred embodiment, cyclodextrins are utilized for cutting nanotubes. In general, cyclodextrins comprise a family of three well-known industrially produced major, and several rare, minor cyclic oligosaccharides. The three major cyclodextrins are crystalline, homogeneous, nonhygroscopic substances, which are torus-like macrorings built up from glucopyranose units. In general, the most important, industrially produced cyclodextrins are the alpha- ($\alpha$-) cyclodextrin, beta-($\beta$-) cyclodextrin, and gamma-($\gamma$-) cyclodextrin. The $\alpha$-cyclodextrin (e.g., Schardinger's $\beta$-dextrin, cyclomaltohexaose, cyclohexaglucan, cyclohexaamylose, $\alpha$-CD, ACD, C6A) comprises six glucopyranose units, the $\beta$-cyclodextrin (e.g., Schardinger's $\beta$-dextrin, cyclomaltoheptaose, cycloheptaglucan, cycloheptaamylose, $\beta$-CD, BCD, C7A) comprises seven such units, and the $\gamma$-cyclodextrin (e.g., Schardinger's $\gamma$-dextrin, cyclomaltooctaose, cyclooctaglucan, cyclooctaamylose, $\gamma$-CD, GCD, C8A) comprises eight such units. Cyclodextrins are further described in "Introduction and General Overview of Cyclodextrin Chemistry" by J. Szejtli, *Chem. Rev.*, 1998, 98, 1743-1753, the disclosure of which is hereby incorporated herein by reference. Cyclodextrins also include other larger compounds, such as δ-cyclodextrin and ε-cyclodextrin as well as any derivatives of cyclodextrins. Other similar organic materials that may be utilized in cutting the nanotubes in alternative embodiments include, but are not limited to, the following: any material comprising at least one glucopyranose unit, any material comprising at least one monosaccharide unit, any material comprising at least one cyclic oligosaccharides, any material comprising at least one cyclic polysaccharide, any material comprising at least one linear oligosaccharides, any material comprising at least one branched oligosaccharides, any material comprising at least one linear polysaccharides, any material comprising at least one branched polysaccharides, and any derivatives of the aforementioned materials.

Figure 2A:
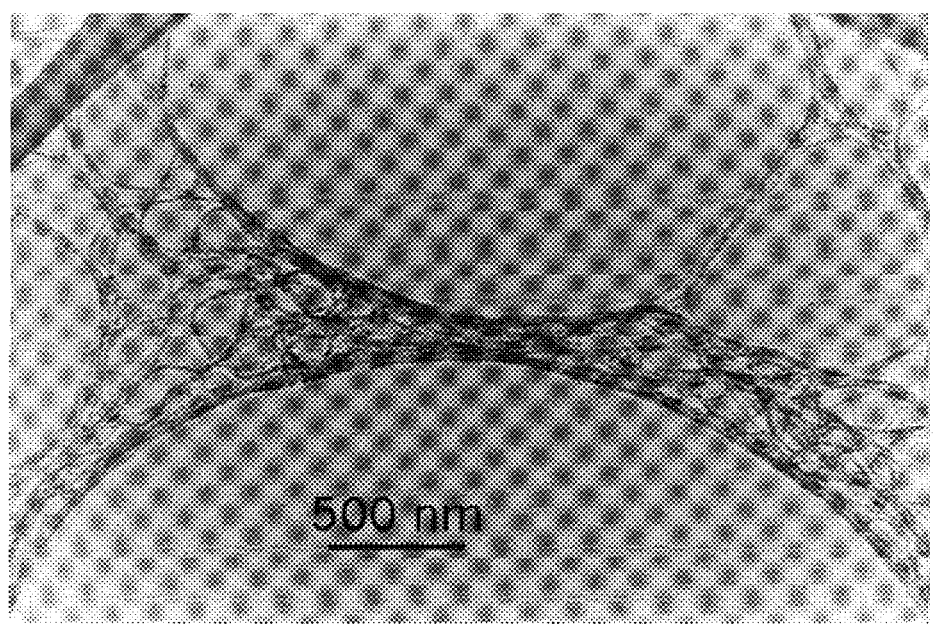
FIG. 2A shows a TEM image of as-prepared SWNTs produced by the HIPCO process.
Figure 2B:
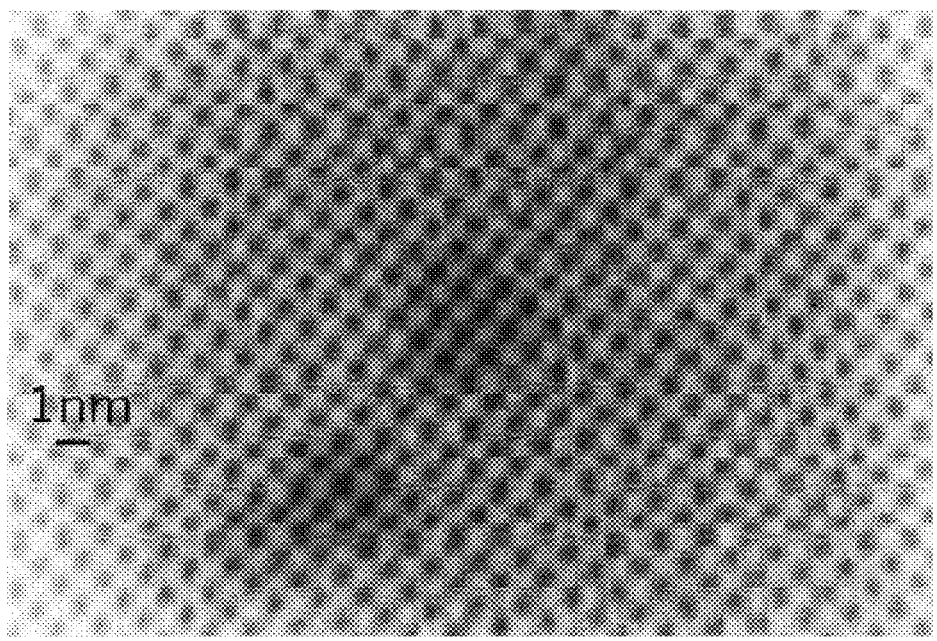
FIG. 2B shows a high-resolution TEM image of as-prepared SWNTs produced by HIPCO process.

Thus, a preferred embodiment provides a "soft" cutting technique utilizing cyclodextrins, such as α-, γ-, β-, δ-, and/or ε-cyclodextrins. Other embodiments may utilize other soft organic materials, such as those identified above. A preferred embodiment of the present invention is suitable for cutting not only relatively small diameter nanotubes (e.g., having a diameter less than 1 nm), such as those produced by the gas-phase catalytic process (e.g., HIPCO), but is also suitable for cutting relatively large diameter nanotubes (e.g., nanotubes having a diameter greater than 1 nm). FIG. 2A is a TEM image of typical SWNTs, as produced by the above-described process. Such SWNTs typically comprise relatively long (e.g., >4 μm) and thick (e.g., 20-100 nm) nanotube ropes, mixed with a small amount of residual iron catalyst particles. A nanotube rope may comprise many entangled nanotubes. FIG. 2B is a high-resolution TEM image of SWNTs produced by the HIPCO process.

An example of a soft cutting procedure according to a preferred embodiment is described hereafter. In one exemplary cutting process of a preferred embodiment, 5.4 mg of SWNTs (produced by the HIPCO process) and 162 mg of γ-cyclodextrin was ground in 1 ml ethanol for 10 minutes (min) by using agate mortar and pestle. The resulting sticky, grayish mixture was further ground for 1 hour (without addition of ethanol) to give a homogeneous, fine black powder. The black powder was then ground for another 1.5 hours, and was then heated at 75° C. for 24 hours.

Figure 3A:
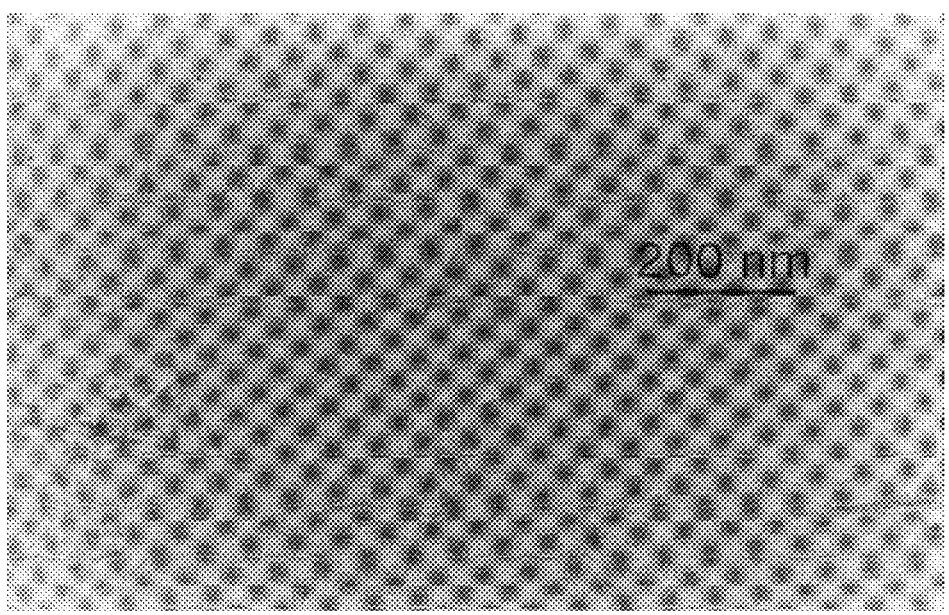
FIG. 3A shows a TEM image of shortened SWNTs obtained by a preferred embodiment of the present invention.
Figure 3B:
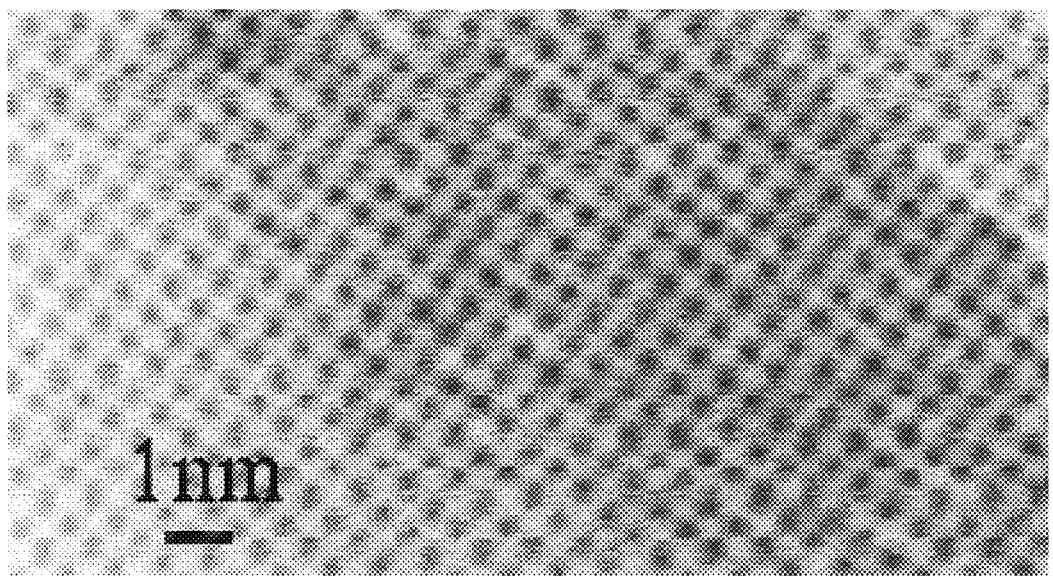
FIGS. 3B-3C each show a high-resolution TEM image of shortened SWNTs obtained by a preferred embodiment of the present invention.
Figure 3C:
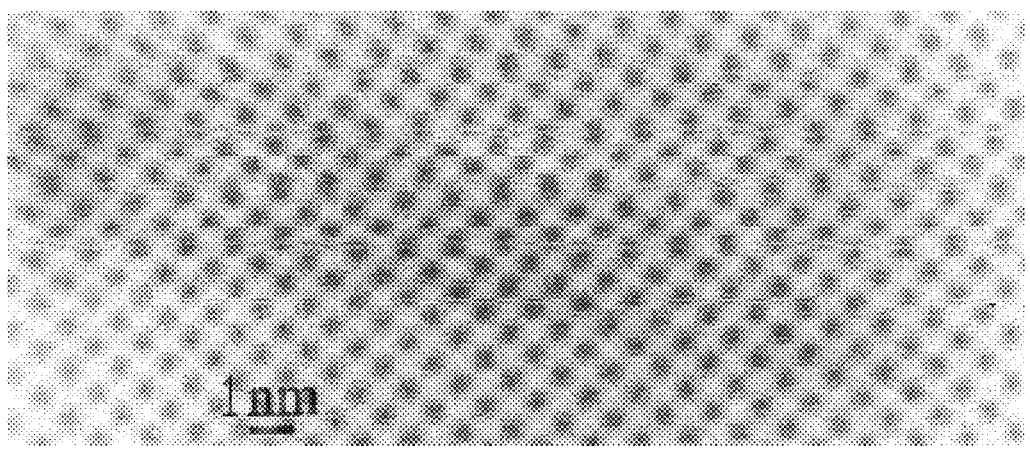

In contrast to the starting SWNT material, nearly all of the product (e.g., >95%) was easily dispersed in deionized water by approximately 10 minutes of sonication to form a quite "stable" colloidal suspension (0.2 mg SWNTs-γ-cyclodextrin/ml) for at least 12 hours. About 90% of the resulting shortened nanotubes (after following the above exemplary procedure) had lengths less than 1 μm, and approximately 70% of which were thin ropes (5-10 nm) with lengths between 100-600 NM. FIG. 3A shows the TEM image of shortened SWNTs. FIGS. 3B and 3C show the high-resolution TEM images of shortened SWNTs. Once the cutting (or grinding) process is complete, the γ-cyclodextrin can be readily removed, for example, by membrane filtration (0.2 μm pore size), followed by thorough washing with deionized water. The resulting black solid, which contains only shortened nanotubes without cyclodextrins, is much more difficult to disperse in water, and surfactant e.g., sodium dodecyl sulfate (SDS), may be utilized to get a stable aqueous suspension by sonication.

While the above exemplary process is described utilizing γ-cyclodextrin, it should be recognized that various other cyclodextrins or various other types of soft material may be utilized in the grinding process in addition to or instead of γ-cyclodextrin, and utilization of any such soft material is intended to be within the scope of the present invention. For example, it has been recognized through preliminary experimentation that grinding of SWNTs in γ-cyclodextrin may provide similar results as those of γ-cyclodextrin. Thus, for instance, β-cyclodextrin may be used in place of γ-cyclodextrin in the above-described exemplary nanotube cutting process. Other cyclodextrins and similar materials as described above may be utilized for cutting nanotubes in alternative embodiments. While the above exemplary process is described utilizing agate mortar and pestle, other grinding and milling techniques, such as ball milling, may be utilized for cutting nanotubes. While the above exemplary process produces mainly shortened nanotubes with lengths between 100-600 nm, the length distributions of shortened nanotubes can be readily adjusted by adjusting experimental parameters such as the weight ratio of cyclodextrins to nanotubes, grinding energy, temperature, grinding time, etc. Shortened nanotubes will have a rich chemistry due to their higher chemical processability, and they can be further sorted by length, chemically functionalized, solubilized and/or chromatographically purified.

While certain soft organic materials, such as cyclodextrins and certain other materials, such as those identified above, are effective for cutting nanotubes, not all soft organic materials are suitable for performing such cutting of nanotubes. As described further below, it is believed that cyclodextrins and certain other materials, such as those identified above, are effective for cutting nanotubes in the manner described above due, at least in part, to their ability to disperse the nanotubes. Various other soft organic materials do not provide such dispersion, and therefore may fail to suitably cut nanotubes in the manner described above with cyclodextrins and certain other materials. For example, the grinding of SWNTs in octadecyl amine (ODA), gives an inhomogeneous, grayish mixture of white (ODA) and black (SWNTs) fine particles, indicating that the SWNT solid is not well dispersed in ODA. The product is difficult to disperse in chloroform and tetrahydofuran and does not form a stable suspension by 10 min of sonication. TEM images of such experiments have shown that the product comprises mostly full-length SWNTs. Also, the grinding of SWNTs in Sodium dodecyl sulfate (SDS) gives similar results as those of ODA.

Figure 4:
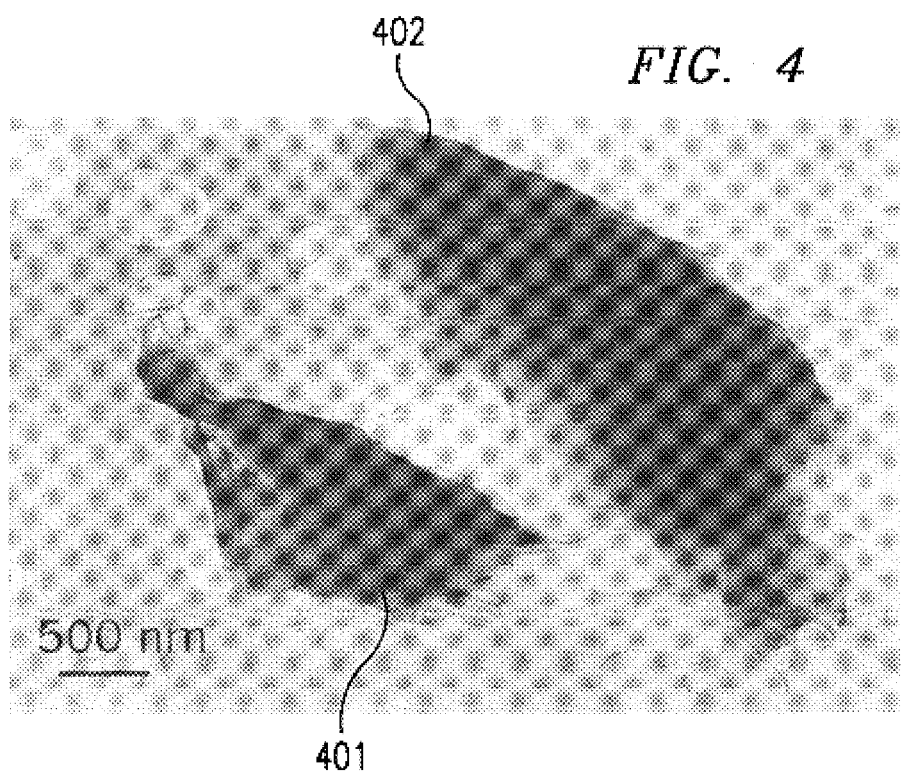
FIG. 4 shows a TEM image of resulting high-density material obtained by grinding nanotubes without addition of chemical material thereto.

Further, the inclusion of a dispersing material, such as cyclodextrins or the other materials identified above, in the grinding process enhances the nanotube cutting process. For example, the grinding of SWNTs without the addition of any chemicals results in black particles with much higher density, examples of which are shown as high-density particles 401 and 402 in the TEM image of FIG. 4. The resulting high-density material is extremely difficult to disperse in either water or organic solvents. It is believed that the nanotubes of a rope compress together during the grinding process if a suitable chemical material is not included with the nanotubes during such grinding process, thus resulting in a high-density material such as that shown in the TEM image of FIG. 4. For example, it is believed that certain materials, such as cyclodextrins, encourage dispersion of the nanotubes during the grinding process, which promotes cutting of the nanotubes rather than such nanotubes compressing together during the grinding process to form a high-density material.

In view of the above, cyclodextrins and certain other materials, such as those identified above, have surprisingly superior solid-state nanotube dispersing capability. That is, cyclodextrins act as excellent solid-state nanotube dispersing reagents. Any soft, organic materials that exhibit such solid-state nanotube dispersing capability are intended to be within the scope of the present invention and may be utilized for manipulating (e.g., dispersing) nanotubes in accordance with certain embodiments of the present invention.

According to certain implementations, a nanotube dispersing reagent, such as cyclodextrins and/or similar materials, such as those identified above, can be utilized for dispersing the nanotubes in appropriate solvents, regardless of whether cutting of the nanotubes is performed. For example, cyclodextrins and similar compounds may encage the appropriate diameter nanotubes to form novel rotaxane structures. Noncovalent functionalization of nanotubes by macrocyclic hosts (e.g., cyclodextrins and cyclic oligosaccharides) will lead to the dissolution of nanotubes in various solvents, such as organic and inorganic solvents. More specifically, an example of an inorganic solvent that may be utilized in a preferred embodiment is water. Examples of organic solvents that may be utilized in certain embodiments of the present invention include, but are not limited to, the following: acetic acid; acetone; acetonitrile; aniline; benzene; benzonitrile; benzyl alcohol; bromobenzene; bromoform; 1-butanol; 2-butanol; carbon disulfide; carbon tetrachloride; chlorobenzene; chloroform; cyclohexane; cyclohexanol; decalin; dibromethane; diethylene glycol; diethylene glycol ethers; diethyl ether; diglyme; dimethoxymethane; N,N-dimethylformamide; ethanol; ethylamine; ethylbenzene; ethylene glycol ethers; ethylene glycol; ethylene oxide; formaldehyde; formic acid; glycerol; heptane; hexane; iodobenzene; mesitylene; methanol; methoxybenzene; methylamine; methylene bromide; methylene chloride; methylpyridine; morpholine; naphthalene; nitrobenzene; nitromethane; octane; pentane; pentyl alcohol; phenol; 1-propanol; 2-propanol; pyridine; pyrrole; pyrrolidine; quinoline; 1,1,2,2-tetrachloroethane; tetrachloroethylene; tetrahydrofuran; tetrahydropyran; tetralin; tetramethylethylenediamine; thiophene; toluene; 1,2,4-trichlorobenzene; 1,1,1-trichloroethane; 1,1,2-trichloroethane; trichloroethylene; triethylamine; triethylene glycol dimethyl ether; 1,3,5-trimethylbenzene; m-xylene; o-xylene; p-xylene; 1,2-dichlorobenzene; 1,3-dichlorobenzene; and 1,4-dichlorobenzene. The noncovalent functionalization of nanotubes by macrocyclic hosts may allow for the separation of nanotubes by diameter, for example, by varying the size of macrocyclic hosts. Further functionalization of macrocyclic hosts may produce various inorganic and organic chemical "handles" on carbon nanotubes and construction of 1-dimensional, 2-dimensional and 3-dimensional assembly of SWNTs, a key to building nanotube devices.

Accordingly, one embodiment of the present invention enables functionalization of nanotubes. For instance, an organic material (e.g., cyclodextrin) may be presented to a plurality of nanotubes, and the organic material may selectively noncovalently functionalize at least one of the plurality of nanotubes based at least in part on nanotube diameter size. That is, the organic material utilized may noncovalently functionalize certain nanotubes of a particular diameter size (or within a particular range of diameter sizes). More specifically, in noncovalently functionalizing the nanotubes, the organic material may encage such nanotubes (e.g., may selectively encage those nanotubes having a particular diameter size). Thereafter, the nanotubes may be separated based on diameter size of the organic material that encages each nanotube. That is, nanotubes may be separated into different groups based on the diameter size of the organic material that encages such nanotube, which may allow for easy sorting of nanotubes, for instance. In one embodiment, noncovalent functionalizing of a nanotube by an organic material forms at least one rotaxane complex. Further, in one embodiment, noncovalent functionalizing of a nanotube by an organic material enables dissolution of such nanotube in a solvent, such as the solvents identified above.

Figure 5A:
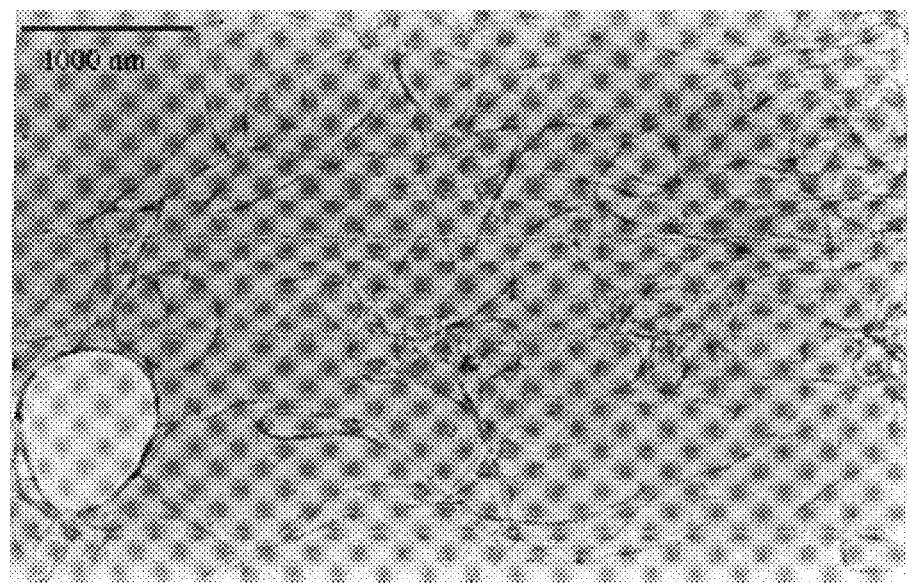
FIGS. 5A-5B show the TEM images of SWNTs dispersed by γ-cyclodextrin and sonication in water: a) 10 minutes of sonication; b) 30 minutes of sonication.
Figure 5B:
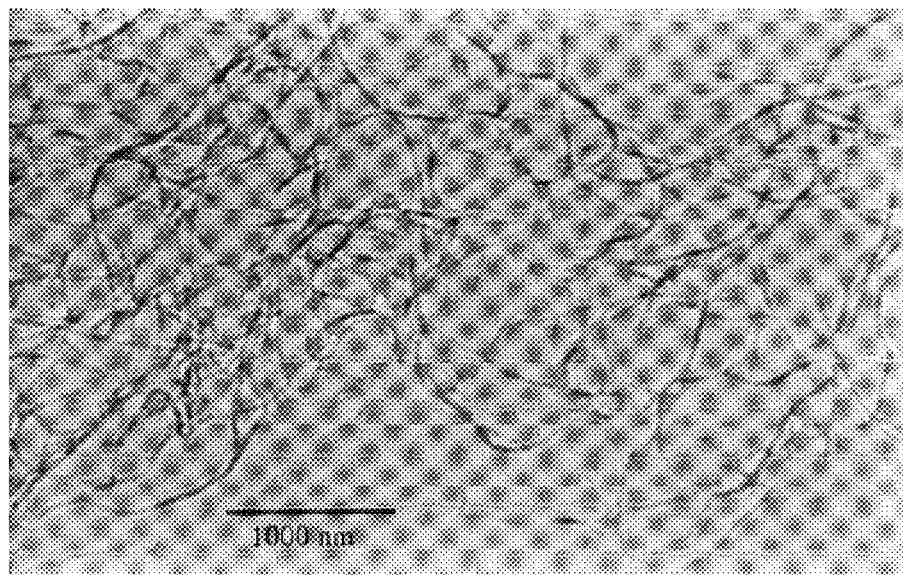

An exemplary process of one embodiment of the present invention is described hereafter, which utilizes cyclodextrins for performing dispersion of nanotubes in water. According to such process, a mixture of SWNTs (e.g., produced by the HIPCO process) and γ-cyclodextrin (weight ratio 1:30) in deionized water (0.2 mg SWNTs-γ-cyclodextrin/ml water) in a plastic container was sonicated under the same condition for a) 10 min and b) 30 min separately, which gave rise to quite stable suspensions. According to TEM images obtained through experimentation (provided as FIGS. 5A and 5B), in each case, over 90% of the SWNTs ropes have lengths greater than 1 μm, usually several micrometers long. This is because no grinding/cutting has been performed, but rather only dispersion. Also, compared to the as-prepared SWNTs (e.g., such as those shown in FIGS. 2A and 2B, the average diameters of the nanotube ropes are reduced due to good dispersion of the nanotubes by the cyclodextrins in water. As described above, certain other compounds may be used instead of or in addition to cyclodextrins, such as the exemplary compounds identified above, which may exhibit the above-described nanotube dispersion capability.

It is believed that the excellent dispersion of SWNT ropes in organic matrix is at least one key to the success of the above-described exemplary cutting process of a preferred embodiment. Otherwise, without proper dispersion of the nanotubes, the flexible nanotube ropes tend to be entangled and compressed together during the grinding to form high-density particles (such as those shown in FIG. 4). Once the nanotube material is well dispersed (e.g., by exposure to cyclodextrin), and the thick nanotube ropes are partially exfoliated into thin nanotube robes, the normal grinding force appears to be strong enough to induce local conformational strains on nanotubes, which eventually lead to the cutting of nanotube ropes, most probably at their defective sites.

As described above, in certain embodiments of the present invention, nanotubes may be dispersed responsive to exposure to a dispersing reagent, irrespective of whether the nanotubes are to be cut into shortened tubes. For instance, without grinding the nanotubes, the aqueous dispersion of SWNTs may be obtained by sonication with γ-cyclodextrin in deionized water, which gives essentially full-length SWNTs (>90%).

Figure 6:
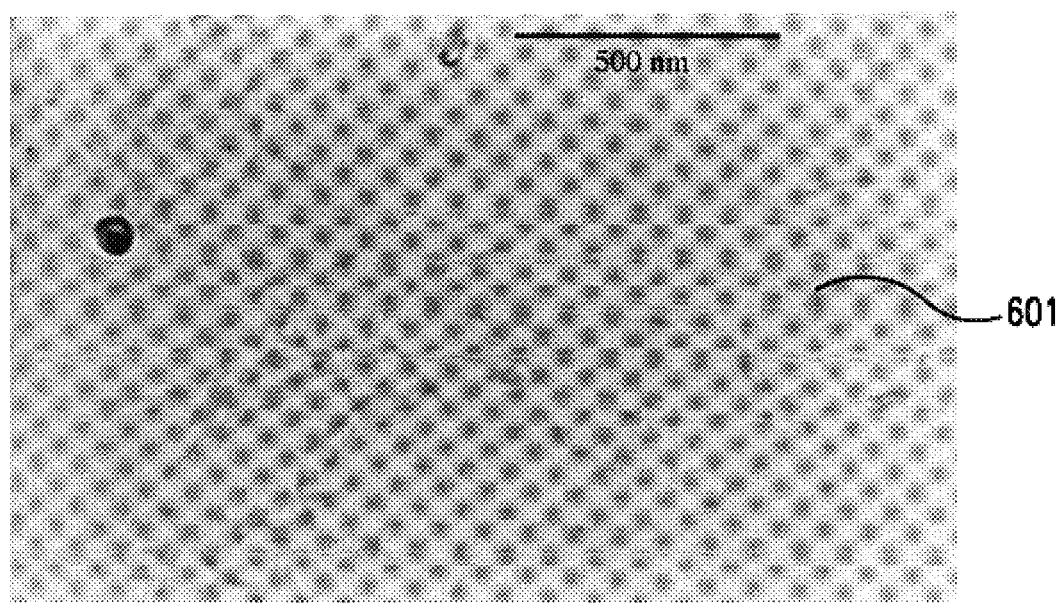
FIG. 6 shows a TEM image of arc-grown SWNTs shortened by a preferred embodiment of the present invention.

While the above examples describe a preferred embodiment for cutting nanotubes produced by a gas-phase catalytic process (e.g., HIPCO process), it should be understood that embodiments of the present invention may be utilized for shortening the length of nanotubes produced by any process now known or later discovered. For example, embodiments of the present invention may be utilized for cutting nanotubes produced through a laser vaporization technique. As another example, embodiments of the present invention may be utilized for cutting electric arc-grown nanotubes. For instance, purified electric arc-grown SWNTs may be cut by utilizing the exemplary process described hereafter. According to such exemplary process for cutting electric arc-grown SWNTs, we have conducted experiments in which 1.1 mg of bucky paper (available from Carbolex, Inc.) and 66 mg γ-cyclodextrin was ground in 1 ml ethanol for 15 min. The resulting mixture was further ground for 2 hours (without addition of ethanol) to give a homogeneous, fine dark-grayish powder. The powder was heated at 75° C. for 24 hours, and was then ground for another 30 min. The aqueous suspension (0.2 mg SWNTs-γ-cyclodextrin/ml) was typically stable for less than 20 min, possibly due to the larger diameter of arc-grown SWNTs. The yield of the resulting shortened SWNTs (100 nm to 1 μm) is estimated by TEM images obtained during experimentation to be over 80%. FIG. 6 provides an exemplary TEM image of resulting shortened arc-grown SWNTs. Note that circle 601 in the image results from the Holey Cabon TEM grid.

In view of the above, various embodiments of the present invention allow for dispersion and/or cutting of nanotubes. According to one embodiment of the present invention, a soft organic material is utilized for cutting nanotubes. According to another embodiment of the present invention, a soluble organic material is utilized for cutting nanotubes. According to yet another embodiment of the present invention, a soft organic material that is soluble is utilized for cutting nanotubes. According to still another embodiment, a material that acts as a dispersing reagent for dispersing nanotubes of a nanotube rope is utilized for dispersing and/or cuffing such nanotubes. In a preferred embodiment, the material utilized for cutting nanotubes comprises cyclodextrin. However, other suitable chemical materials, such as the exemplary compounds identified hereinabove, may be utilized in other embodiments of the present invention.

A preferred application of the present invention is utilized to disperse and/or cut carbon nanotubes. However, embodiments of the present invention may be utilized for dispersing and/or cutting other types of nanotubes. Additionally, a preferred application of the present invention is utilized to disperse and/or cut carbon nanotubes that have relatively small diameters, such as those produced by the above-described gas-phase process. However, embodiments of the present invention may be utilized for dispersing and/or cutting nanotubes produced by any suitable process now known or later discovered, including without limitation a laser vaporization process and an electric arc process.

Also, it should be noted that the term "nano" typically refers to a unit of measure of $10^{-9}$ in scientific notation and a nanometer is $10^{-9}$ meters. However, in the description and claims herein the term "nano" refers to structures that are very small and would typically be thought of and measured in the nanometer range. The term is meant to cover structures with at least one dimension between 0.4 nm and 1000 nm. The preferred range for the process described herein is nanotube diameters between 0.4 nm and 400 nm, and nanotube lengths between 1 nm and 1 millimeter (mm).

Shortened SWNTs will likely find applications in many technological fields. Three major fields in which it is anticipated shortened SWNTs will likely find application are identified hereafter, and many other fields may also find use for shortened SWNTs. One major field in which shortened SWNTs will likely find application is the field of nanostructured composites and copolymers. Processable shortened SWNTs can be further polymerized and copolymerized to form nanotube-based polymer composites and copolymers which may find applications in the areas of electromagnetic shielding coatings for military aircraft and ships, as well as cellular telephones and laptops, antistatic coatings (e.g., for automobiles), and organic thin film devices for microelectronics and micro-optoelectronics. Another major field in which shortened SWNTs will likely find application is the field of functional nanostructures. Shortened SWNTs (e.g., having length<1 μm) are expected to have a rich chemistry due to their higher chemical processability (for example, they can be further sorted by length, chemically functionalized, solubilized and chromatographically purified), and they are the fitting subject of a new branch of organic chemistry, a molecular nanotechnology of great promise. Applications could include (but not be limited to): semiconductors for transistors, resonant tunneling diodes, memory elements, metallic interconnects, electromechanical devices, chemical-electrical-mechanical devices, antenna arrays, atomic force microscope (AFM) tips, scanning tunneling microscope (STM) tips, chemical sensors, and nanolithography. A third major field in which shortened SWNTs will likely find application is the field of energy storage systems. For example, shortened SWNT materials, due to their high densities of open ends, may find applications in electrochemical energy storage systems for lithium batteries and hydrogen storage systems for fuel cells.

It should be understood that while specific exemplary processes are described above for dispersing and/or cutting nanotubes (e.g., utilizing γ-cyclodextrin), the scope of the present invention is not intended to be limited solely to such exemplary processes. Rather, such processes are intended solely as examples that render the disclosure enabling for various other processes for dispersing and/or cutting nanotubes. Thus, for example, the ratio of cyclodextrin (or other suitable material) to nanotubes, grinding time, heating temperature/time, and various other steps in the above-described exemplary processes may be varied. For instance, the grinding time may be increased, which may result in further shortening of the average length of the resulting shortened nanotubes. Also, other grinding and milling techniques, such as ball milling (e.g., planetary ball milling) can be utilized to cut the nanotubes in soft organic materials.

Certain embodiments of the present invention provide a solid-state dispersing/cutting process for nanotubes that successfully avoids not only sonication in strong acids and oxidants which can severely damage relatively small diameter nanotubes (such as those produced with the above-described gas-phase catalytic reaction process), but also long-time sonication in any solvent which could make scaling-up difficult. Also, in certain embodiments of the present invention, a grinding mechanism, such as a mortar and pestle, may be utilized for grinding the nanotubes for cutting. Larger-scale production of shortened nanotubes may be achieved through utilizing an appropriate grinding mechanism, such as a ball mill (also known as a centrifugal or planetary mill), which is a device commonly used to rapidly grind materials to colloidal fineness by developing high grinding energy via centrifugal and/or planetary action. Any suitable mechanism now known or later developed for grinding nanotubes are intended to be within the scope of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for manipulating single-walled carbon nanotubes comprising:

presenting a solid organic material to a plurality of single-walled nanotubes; and using said solid organic material to manipulate said plurality of nanotubes, wherein said plurality of nanotubes are manipulated by at least one of:

(a) dispersing at least a portion of said plurality of nanotubes;
(b) dissolving at least a portion of said plurality of nanotubes in a solvent; and
(c) functionalizing at least a portion of said plurality of nanotubes.

2. The method of claim 1 wherein said solid organic material comprises a solid-state nanotube dispersing reagent, and said plurality of nanotubes are manipulated by dispersing at least a portion of said plurality of nanotubes with said dispersing reagent.

3. The method of claim 2 wherein said solid-state nanotube dispersing reagent comprises cyclodextrin.

4. The method of claim 3 wherein said cyclodextrin comprises at least one member selected from the group consisting of:
γ-cyclodextrin, α-cyclodextrin, β-cyclodextrin, δ-cyclodextrin, ε-cyclodextrin, and derivatives thereof.

5. The method of claim 2 wherein said solid-state nanotube dispersing reagent comprises at least one member selected from the group consisting of:
glucopyranoses, monosaccharides, cyclic oligosaccharides, linear oligosaccharides, branched oligosaccharides, cyclic polysaccharides, linear polysaccharides, branched polysaccharides, and derivatives thereof.

6. The method of claim 5 wherein said plurality of nanotubes are produced by a gas-phase catalytic reaction process.

7. The method of claim 5 wherein said plurality of nanotubes are produced by an electric arc process.

8. The method of claim 5 wherein said plurality of nanotubes are produced by a laser vaporization process.

9. The method of claim 1 further comprising grinding at least a portion of said plurality of nanotubes to cut said at least a portion of said plurality of nanotubes.

10. The method of claim 1 wherein said solid organic material is soluble in at least one member selected from the group consisting of an organic solvent and an inorganic solvent.

11. The method of claim 1 wherein said solid organic material comprises a nanotube-dispersing reagent, and wherein said nanotube-dispersing reagent is presented to said plurality of nanotubes in at least one solvent, and said plurality of nanotubes are manipulated by dissolving at least a portion of said plurality of nanotubes.

12. The method of claim 11 wherein said nanotube-dispersing reagent comprises cyclodextrin.

13. The method of claim 12 wherein said cyclodextrin comprises at least one member selected from the group consisting of:
γ-cyclodextrin, α-cyclodextrin, β-cyclodextrin, δ-cyclodextrin, ε-cyclodextrin, and derivatives thereof.

14. The method of claim 11 wherein said nanotube-dispersing reagent comprises at least one member selected from the group consisting of:
glucopyranoses, monosaccharides, cyclic oligosaccharides, linear oligosaccharides, branched oligosaccharides, cyclic polysaccharides, linear polysaccharides, branched polysaccharides, and derivatives thereof.

15. The method of claim 1 wherein said at least one nanotube has a diameter of at least 0.4 nm.

16. The method of claim 11 wherein said at least one solvent comprises an organic solvent.

17. The method of claim 16 wherein said organic solvent comprises at least one solvent selected from the group consisting of: acetic acid; acetone; acetonitrile; aniline; benzene; benzonitrile; benzyl alcohol; bromobenzene; bromoform; 1-butanol; 2-butanol; carbon disulfide; carbon tetrachloride; chlorobenzene; chloroform; cyclohexane; cyclohexanol; decalin; dibromethane; diethylene glycol; diethylene glycol ethers; diethyl ether; diglyme; dimethoxymethane; N,N-dimethylformamide; ethanol; ethylamine; ethylbenzene; ethylene glycol ethers; ethylene glycol; ethylene oxide; formaldehyde; formic acid; glycerol; heptane; hexane; iodobenzene; mesitylene; methanol; methoxybenzene; methylamine; methylene bromide; methylene chloride; methylpyridine; morpholine; naphthalene; nitrobenzene; nitromethane; octane; pentane; pentyl alcohol; phenol; 1-propanol; 2-propanol; pyridine; pyrrole; pyrrolidine; quinoline; 1,1,2,2-tetrachloroethane; tetrachloroethylene; tetrahydrofuran; tetrahydropyran; tetralin; tetramethylethylenediamine; thiophene; toluene; 1,2,4-trichlorobenzene; 1,1,1-trichloroethane; 1,1,2-trichloroethane; trichloroethylene; triethylamine; triethylene glycol dimethyl ether; 1,3,5-trimethylbenzene; m-xylene; o-xylene; p-xylene; 1,2-dichlorobenzene; 1,3-dichlorobenzene; and 1,4-dichlorobenzene.

18. The method of claim 11 wherein said at least one solvent comprises an inorganic solvent.

19. The method of claim 18 wherein said inorganic solvent comprises water.

20. The method of claim 1 wherein said plurality of nanotubes are manipulated by selectively noncovalently functionalizing at least one of said plurality of nanotubes, based at least in part on a diameter of said at least one plurality of nanotubes.

21. The method of claim 20 wherein said noncovalently functionalizing comprises said organic material encaging said at least one of said plurality of nanotubes.

22. The method of claim 21 further comprising separating said noncovalently functionalized nanotubes based on diameter size of said organic material.

23. The method of claim 20 wherein said noncovalently functionalizing comprises forming at least one rotaxane complex.

24. The method of claim 20 wherein said noncovalently functionalizing enables dissolution of said at least one of said plurality of nanotubes in at least one solvent.

25. The method of claim 24 wherein said at least one solvent comprises an organic solvent selected from the group consisting of: acetic acid; acetone; acetonitrile; aniline; benzene; benzonitrile; benzyl alcohol; bromobenzene; bromoform; 1-butanol; 2-butanol; carbon disulfide; carbon tetrachloride; chlorobenzene; chloroform; cyclohexane; cyclohexanol; decalin; dibromethane; diethylene glycol; diethylene glycol ethers; diethyl ether; diglyme; dimethoxymethane; N,N-dimethylformamide; ethanol; ethylamine; ethylbenzene; ethylene glycol ethers; ethylene glycol; ethylene oxide; formaldehyde; formic acid; glycerol; heptane; hexane; iodobenzene; mesitylene; methanol; methoxybenzene; methylamine; methylene bromide; methylene chloride; methylpyridine; morpholine; naphthalene; nitrobenzene; nitromethane; octane; pentane; pentyl alcohol; phenol; 1-propanol; 2-propanol; pyridine; pyrrole; pyrrolidine; quinoline; 1,1,2,2-tetrachloroethane; tetrachloroethylene; tetrahydrofuran; tetrahydropyran; tetralin; tetramethylethylenediamine; thiophene; toluene; 1,2,4-trichlorobenzene; 1,1,1-trichloroethane; 1,1,2-trichloroethane; trichloroethylene; triethylamine; triethylene glycol dimethyl ether; 1,3,5-trimethylbenzene; m-xylene; o-xylene; p-xylene; 1,2-dichlorobenzene; 1,3-dichlorobenzene; and 1,4-dichlorobenzene.

26. The method of claim 24 wherein said at least one solvent comprises an inorganic solvent.

27. The method of claim 20 wherein said organic material comprises cyclodextrin.

28. The method of claim 27 wherein said cyclodextrin comprises at least one member selected from the group consisting of:
γ-cyclodextrin, α-cyclodextrin, β-cyclodextrin, δ-cyclodextrin, ε-cyclodextrin, and derivatives thereof.

29. The method of claim 20 wherein said organic material comprises at least one member selected from the group consisting of:
glucopyranoses, monosaccharides, cyclic oligosaccharides, linear oligosaccharides, branched oligosaccharides, cyclic polysaccharides, linear polysaccharides, branched polysaccharides, and derivatives thereof.

30. The method of claim 20 wherein said organic material comprises at least one macrocyclic compound.

31. The method of claim 30 wherein said at least one macrocyclic compound contains at least one member selected from the group consisting of:
at least one glucopyranose unit, and at least one monosaccharide unit.

32. The method of claim 20 wherein said plurality of nanotubes include nanotubes that have diameters of at least 0.4 nm.

33. A method for manipulating single-walled carbon nanotubes comprising:
dispersing at least a portion of a plurality of single-walled carbon nanotubes with a solid organic material.

34. The method of claim 33 wherein said solid organic material comprises cyclodextrin.

35. The method of claim 34 wherein said cyclodextrin comprises at least one member selected from the group consisting of:
γ-cyclodextrin, α-cyclodextrin, β-cyclodextrin, δ-cyclodextrin, ε-cyclodextrin, and derivatives thereof.

36. The method of claim 33 wherein said solid organic material comprises at least one member selected from the group consisting of:
glucopyranoses, monosaccharides, cyclic oligosaccharides, linear oligosaccharides, branched oligosaccharides, cyclic polysaccharides, linear polysaccharides, branched polysaccharides, and derivatives thereof.

37. The method of claim 33 further comprising grinding at least a portion of said plurality of nanotubes to cut said at least a portion of said plurality of nanotubes.

38. A method for manipulating single-walled carbon nanotubes comprising:
mixing at least one solvent, a soluble organic material, and a plurality of single-walled carbon nanotubes; and
dissolving at least a portion of said plurality of nanotubes.

39. The method of claim 38 wherein said solid organic material comprises cyclodextrin.

40. The method of claim 39 wherein said cyclodextrin comprises at least one member selected from the group consisting of:
γ-cyclodextrin, α-cyclodextrin, β-cyclodextrin, δ-cyclodextrin, ε-cyclodextrin, and derivatives thereof.

41. The method of claim 38 wherein said solid organic material comprises at least one member selected from the group consisting of:
glucopyranoses, monosaccharides, cyclic oligosaccharides, linear oligosaccharides, branched oligosaccharides, cyclic polysaccharides, linear polysaccharides, branched polysaccharides, and derivatives thereof.

42. The method of claim 38 wherein said at least one solvent comprises an organic solvent.

43. The method of claim 42 wherein said organic solvent comprises at least one solvent selected from the group consisting of: acetic acid; acetone; acetonitrile; aniline; benzene; benzonitrile; benzyl alcohol; bromobenzene; bromoform; 1-butanol; 2-butanol; carbon disulfide; carbon tetrachloride; chlorobenzene; chloroform; cyclohexane; cyclohexanol; decalin; dibromethane; diethylene glycol; diethylene glycol ethers; diethyl ether; diglyme; dimethoxymethane; N,N-dimethylformamide; ethanol; ethylamine; ethylbenzene; ethylene glycol ethers; ethylene glycol; ethylene oxide; formaldehyde; formic acid; glycerol; heptane; hexane; iodobenzene; mesitylene; methanol; methoxybenzene; methylamine; methylene bromide; methylene chloride; methylpyridine; morpholine; naphthalene; nitrobenzene; nitromethane; octane; pentane; pentyl alcohol; phenol; 1-propanol; 2-propanol; pyridine; pyrrole; pyrrolidine; quinoline; 1,1,2,2-tetrachloroethane; tetrachloroethylene; tetrahydrofuran; tetrahydropyran; tetralin; tetramethylethylenediamine; thiophene; toluene; 1,2,4-trichlorobenzene; 1,1,1-trichloroethane; 1,1,2-trichloroethane; trichloroethylene; triethylamine; triethylene glycol dimethyl ether; 1,3,5-trimethylbenzene; m-xylene; o-xylene; p-xylene; 1,2-dichlorobenzene; 1,3-dichlorobenzene; and 1,4-dichlorobenzene.

44. The method of claim 38 wherein said at least one solvent comprises an inorganic solvent.

45. The method of claim 44 wherein said inorganic solvent comprises water.

46. A method for manipulating single-walled carbon nanotubes comprising:
selectively noncovalently functionalizing at least a portion of a plurality of single-walled carbon nanotubes with a solid organic material.

47. The method of claim 46 wherein said selective noncovalent functionalization is based at least in part on a diameter of said at least a portion of said plurality of nanotubes.

48. The method of claim 46 wherein said selective noncovalent functionalization comprises said solid organic material engaging at least one of said portion of said plurality of nanotubes.

49. The method of claim 48 further comprising separating said noncovalently functionalized nanotubes based on diameter size of said solid organic material.

50. The method of claim 46 wherein said selective noncovalent functionalization comprises forming at least one rotaxane complex.

51. The method of claim 46 wherein said selective noncovalent functionalization enables dissolution of said at least a portion of said plurality of nanotubes in at least one solvent.

52. The method of claim 51 wherein said at least one solvent comprises an organic solvent selected from the group consisting of: acetic acid; acetone; acetonitrile; aniline; benzene; benzonitrile; benzyl alcohol; bromobenzene; bromoform; 1-butanol; 2-butanol; carbon disulfide; carbon tetrachloride; chlorobenzene; chloroform; cyclohexane; cyclohexanol; decalin; dibromethane; diethylene glycol; diethylene glycol ethers; diethyl ether; diglyme; dimethoxymethane; N,N-dimethylformamide; ethanol; ethylamine; ethylbenzene; ethylene glycol ethers; ethylene glycol; ethylene oxide; formaldehyde; formic acid; glycerol; heptane; hexane; iodobenzene; mesitylene; methanol; methoxybenzene; methylamine; methylene bromide; methylene chloride; methylpyridine; morpholine; naphthalene; nitrobenzene; nitromethane; octane; pentane; pentyl alcohol; phenol; 1-propanol; 2-propanol; pyridine; pyrrole; pyrrolidine; quinoline; 1,1,2,2-tetrachloroethane; tetrachloroethylene; tetrahydrofuran; tetrahydropyran; tetralin; tetramethylethylenediamine; thiophene; toluene; 1,2,4-trichlorobenzene; 1,1,1-trichloroethane; 1,1,2-trichloroethane; trichloroethylene; triethylamine; triethylene glycol dimethyl ether; 1,3,5-trimethylbenzene; m-xylene; o-xylene; p-xylene; 1,2-dichlorobenzene; 1,3-dichlorobenzene; and 1,4-dichlorobenzene.

53. The method of claim 51 wherein said at least one solvent comprises an inorganic solvent.

54. The method of claim 46 wherein said solid organic material comprises cyclodextrin.

55. The method of claim 54 wherein said cyclodextrin comprises at least one member selected from the group consisting of:

γ-cyclodextrin, α-cyclodextrin, β-cyclodextrin, δ-cyclodextrin, ε-cyclodextrin, and derivatives thereof.

56. The method of claim 46 wherein said solid organic material comprises at least one member selected from the group consisting of:

glucopyranoses, monosaccharides; cyclic oligosaccharides, linear oligosaccharides, branched oligosaccharides, cyclic polysaccharides, linear polysaccharides, branched polysaccharides, and derivatives thereof.

57. The method of claim 46 wherein said solid organic material comprises at least one macrocyclic compound.

58. The method of claim 57 wherein said at least one macrocyclic compound contains at least one member selected from the group consisting of:

at least one glucopyranose unit, and at least one monosaccharide unit.

59. The method of claim 46 wherein said plurality of nanotubes include nanotubes that have diameters of at least 0.4 nm.

* * * * *

UNITED STATES PATENT AND TRADEMARK OFFICE
CERTIFICATE OF CORRECTION

PATENT NO. : 7,344,691 B2
APPLICATION NO. : 10/732490
DATED : March 18, 2008
INVENTOR(S) : Jian Chen and Mark J. Dyer It is certified that error appears in the above-identified patent and that said Letters Patent is hereby corrected as shown below:

On the title page: item (73): Assignee name should read as -- Zyvex Performance Materials, LLC --.

Column 16, line 27, the word "one" should be deleted and the words -- a portion -- should be added instead.

Column 16, line 32, the first "said" should be deleted.

Column 16, line 40, the word "one" should be deleted and the words -- a portion -- should be added instead.

Column 17, line 63, the word "oligosaccharidcs" should read as -- oligosaccharides --.

Column 18, line 14, the word "naphthalcne" should read as -- naphthalene --.

Signed and Sealed this

First Day of July, 2008

JON W. DUDAS
*Director of the United States Patent and Trademark Office*